US012587128B2

(12) United States Patent
    Kobayashi

(10) Patent No.: US 12,587,128 B2
(45) Date of Patent: Mar. 24, 2026

(54) TRESTLE

(71) Applicants: Sunstack, LLC, Plainfield, NJ (US); Roof and Solar Technologies Inc., Poway, CA (US)

(72) Inventor: Shuichi Kobayashi, Poway, CA (US)

(73) Assignees: SUNSTACK, LLC, Plainfield, NJ (US); ROOF AND SOLAR TECHNOLOGIES INC., Poway, CA (US)

( * ) Notice: Subject to any disclaimer, the term of this patent is extended or adjusted under 35 U.S.C. 154(b) by 186 days.

(21) Appl. No.: 18/491,395

(22) Filed: Oct. 20, 2023

(65) Prior Publication Data

US 2024/0333203 A1    Oct. 3, 2024

(30) Foreign Application Priority Data

Mar. 30, 2023    (JP) ................................. 2023-054580

(51) Int. Cl.
    H02S 20/30        (2014.01)
    F24S 25/67        (2018.01)
    (Continued)

(52) U.S. Cl.
    CPC .............. H02S 20/30 (2014.12); F24S 25/67 (2018.05); H02S 30/10 (2014.12);
    (Continued)

(58) Field of Classification Search
    CPC ............... F24S 25/67; F24S 2025/6003; F24S 2025/6006; H02S 20/23; H02S 20/30; H02S 30/10; Y02E 10/47
    See application file for complete search history.

(56) References Cited

U.S. PATENT DOCUMENTS 9,431,953 B2    8/2016    Stearns
10,797,634 B1    10/2020    Jasmin
(Continued)

FOREIGN PATENT DOCUMENTS

CN    215368328 U    12/2021
JP    2001-065120 A    3/2001
(Continued)

OTHER PUBLICATIONS

Office Action dated Aug. 20, 2025, issued for the corresponding U.S. Appl. No. 18/396,882.

*Primary Examiner* — Jessie T Fonseca
(74) *Attorney, Agent, or Firm* — Ohlandt, Greeley and Perle, LLP.

(57)        ABSTRACT

A trestle includes a fixing unit for fixing a solar panel, a receiving member receiving the fixing unit from below, a base unit, and a first fastener. The base unit is formed with a height direction adjusting groove for fixing the receiving member to be adjustable in a height direction from a roof surface. The first fastener fixes the receiving member to the base unit by being attached to the height direction adjusting groove. The receiving member includes a sandwiching portion that sandwiches a part of the fixing unit and is formed with a hole into which the first fastener is inserted. The first fastener is formed in a shape attachable to the height direction adjusting groove and a shape insertable into the hole, and sandwiches a part of the fixing unit in the sandwiching portion.

11 Claims, 28 Drawing Sheets

(51) Int. Cl.
     *H02S 30/10*          (2014.01)
     *F24S 25/60*          (2018.01)
(52) U.S. Cl.
     CPC ................. *F24S 2025/6003* (2018.05); *F24S 2025/6006* (2018.05); *Y02E 10/47* (2013.01)

(56)              References Cited

U.S. PATENT DOCUMENTS

| | | | |
|---|---|---|---|
| 10,840,850 B1 * | 11/2020 | Atia | F24S 25/15 |
| 10,951,157 B1 | 3/2021 | Young | |
| 11,594,998 B1 | 2/2023 | Kapla | |
| 11,757,400 B1 * | 9/2023 | Jasmin | H02S 20/23 248/237 |
| 12,074,558 B2 * | 8/2024 | Neal | F24S 25/61 |
| 2011/0174947 A1 * | 7/2011 | Wu | F24S 25/33 248/274.1 |
| 2012/0193310 A1 * | 8/2012 | Fluhrer | F24S 25/30 248/316.4 |
| 2015/0288320 A1 | 10/2015 | Stearns | |
| 2016/0043689 A1 * | 2/2016 | McPheeters | H02S 30/10 248/287.1 |
| 2016/0111835 A1 * | 4/2016 | Nayar | H02S 20/23 439/122 |
| 2016/0111995 A1 * | 4/2016 | Nayar | F24S 25/636 211/41.1 |
| 2016/0111997 A1 * | 4/2016 | Ganshaw | F24S 25/61 248/224.7 |
| 2017/0102167 A1 | 4/2017 | Stephan | |
| 2017/0194902 A1 * | 7/2017 | Meine | F24S 25/61 |
| 2018/0342974 A1 | 11/2018 | Jasmin | |
| 2019/0190437 A1 | 6/2019 | Kobayashi | |
| 2019/0372507 A1 * | 12/2019 | Kobayashi | F16B 5/0628 |
| 2020/0313604 A1 | 10/2020 | Harris | |
| 2021/0067083 A1 | 3/2021 | Stephan | |
| 2021/0194410 A1 | 6/2021 | Yang | |
| 2021/0285596 A1 * | 9/2021 | Affentranger, Jr. | F16M 13/02 |
| 2021/0285689 A1 * | 9/2021 | Affentranger, Jr. | H02S 30/10 |
| 2021/0328540 A1 | 10/2021 | Wentworth | |
| 2022/0060143 A1 | 2/2022 | Neal | |
| 2022/0216823 A1 | 7/2022 | Wang | |
| 2022/0255494 A1 | 8/2022 | Wildes | |
| 2022/0337187 A1 | 10/2022 | Huang | |
| 2022/0345074 A1 * | 10/2022 | Neal | H02S 30/10 |
| 2022/0352848 A1 * | 11/2022 | Meine | H02S 20/23 |
| 2022/0407451 A1 | 12/2022 | Jacobs | |
| 2023/0068225 A1 | 3/2023 | Lowrey | |
| 2023/0133308 A1 | 5/2023 | Ballentine | |
| 2023/0228372 A1 * | 7/2023 | Stephan | H02S 30/00 29/525.01 |

FOREIGN PATENT DOCUMENTS

| | | |
|---|---|---|
| JP | 3160551 U | 7/2010 |
| JP | 2012-180668 A | 9/2012 |
| JP | 2006-057357 A | 1/2014 |
| JP | 3189303 U | 3/2014 |
| JP | 2015-074903 A | 4/2015 |
| JP | 2020-003050 A | 1/2020 |

* cited by examiner

TRESTLE

CROSS-REFERENCE TO RELATED APPLICATIONS

This application claims the benefit of Japanese Patent Application No. 2023-054580, filed on Mar. 30, 2023, the entire disclosure of which is incorporated by reference herein.

FIELD OF THE INVENTION

This application relates generally to a trestle.

BACKGROUND OF THE INVENTION

In a functional panel installation structure disclosed in Unexamined Japanese Patent Application Publication No. 2006-057357, a sash bar material for supporting a functional panel is fixed via a fixture to a support piece provided to a support roof tile. In the functional panel installation structure disclosed in Unexamined Japanese Patent Application Publication No. 2006-057357, the fixture is attached to the support piece provided to the support roof tile with bolts, and the sash bar material is attached to the fixture with screws.

In the functional panel installation structure disclosed in Unexamined Japanese Patent Application Publication No. 2006-057357, the sash bar material is fixed to the support piece via the fixture by using two fasteners of bolts and screws. Accordingly, the functional panel installation structure disclosed in Unexamined Japanese Patent Application Publication No. 2006-057357 has a problem that a plurality of works of a work of screwing the bolt and a work of screwing the screw needs to be performed, and the efficiency of the attachment work of the support piece, the fixture, and the sash bar material is low. As a consequence, there is room for improvement due to inefficiency of the work of installing, on a roof surface, an installation object to be attached using the support piece, the fixture, and the sash bar material.

The present disclosure is made with the view of the above situation, and an objective of the present disclosure is to provide a trestle capable of improving the efficiency of installation work of an installation object on a roof surface of a building.

SUMMARY OF THE INVENTION

A trestle according to the present disclosure that achieves the objective described above includes:
 a fixing unit for fixing an installation object installed on a roof surface of a building;
 a receiving member receiving the fixing unit from below;
 a base unit formed with a receiving member mounting portion for fixing the receiving member to be adjustable in a height direction from the roof surface, and fixed to the roof surface; and
 a first fastener fixing the receiving member to the base unit by being attached to the receiving member mounting portion, wherein
 the receiving member includes a sandwiching portion that sandwiches a part of the fixing unit and is formed with an inserted portion into which the first fastener is inserted, and
 the first fastener is formed in a shape attachable to the receiving member mounting portion and a shape insertable into the inserted portion, and sandwiches a part of the fixing unit in the sandwiching portion.

The receiving member mounting portion may be a height direction adjusting groove into which the first fastener is inserted, the height direction adjusting groove extending in the height direction.

The inserted portion may be a hole or a notch, and may be formed at a position below a position where the receiving member sandwiches a part of the fixing unit.

A first engager may be formed on one of the fixing unit and the receiving member, and may engage the other of the fixing unit and the receiving member, thereby forming a first engaged portion that suppresses the fixing unit from detaching from the receiving member upward in the height direction.

The base unit may include:
 a base formed with a support member fixing groove;
 a slide member slidably fitted into the support member fixing groove; and
 a support member fixed to the slide member and provided with the receiving member mounting portion.
The fixing unit may include:
 an installation object arrangement member on which the installation object is disposed;
 a fixing member pressing and fixing the installation object disposed on the installation object arrangement member; and
 a second fastener sandwiching the installation object between the installation object arrangement member and the fixing member, and fastening the installation object arrangement member and the fixing member.
The building may include an eave and a ridge of a roof,
 a fixing member mounting groove may be formed in the installation object arrangement member in a direction intersecting an eave-ridge direction or along the same direction as the eave-ridge direction, the eave-ridge direction being a direction from the ridge to the cave of the building,
 a second engaged portion may be formed in the fixing member mounting groove, and
 the second fastener may be formed with a second engager that engages with the second engaged portion.
The second fastener may include a rhombic bolt or a rhombic nut for attaching the fixing member to the fixing member mounting groove, and
 the second engager may be provided on a rhombic portion of the rhombic bolt or the rhombic nut.
The installation object arrangement member may be formed in a shape extending from one end to the other end,
 the fixing unit may include a cover that covers at least a part of the one end of the installation object arrangement member, and
 the cover may be disposed on the installation object arrangement member, and may be pressed by the fixing member to be fixed to the installation object arrangement member.
The cover may include:
 a cover main body; and
 a spacer disposed between the cover main body and the installation object arrangement member, and adjusting a position in the height direction of the cover main body from the installation object arrangement member.
The fixing unit may include a fixing member receiving member that is disposed on the installation object arrangement member, and may be pressed by the fixing member to be fixed to the installation object arrangement member, and the fixing member receiving member may be disposed on the installation object arrangement member together with the installation object, or may be disposed on the installation object arrangement member instead of the installation object.

The installation object arrangement member may be provided with an arrangement surface on which the installation object is disposed, and the fixing unit may include a tilting suppressing member that suppresses the fixing member from tilting with respect to the arrangement surface by supporting the fixing member with respect to the arrangement surface, the tilting suppressing member having a surface to be disposed on the arrangement surface.

The tilting suppressing member may be formed with a third engager that engages the installation object disposed on the arrangement surface, thereby suppressing the fixing member from tilting with respect to the arrangement surface together with the tilting suppressing member.

A trestle according to the present disclosure includes a first fastener that fixes a receiving member to a base unit and sandwiches a part of a fixing unit in a sandwiching portion of the receiving member. Therefore, in the trestle according to the present disclosure, the receiving member can be fixed to the base unit and the fixing unit can be fixed to the receiving member by the first fastener. As a result, the present disclosure can provide a trestle capable of improving the efficiency of installation work of an installation object on a roof surface of a building.

BRIEF DESCRIPTION OF DRAWINGS

A more complete understanding of this application can be obtained when the following detailed description is considered in conjunction with the following drawings, in which.

DETAILED DESCRIPTION OF THE INVENTION

Embodiment 1

Figure 1:
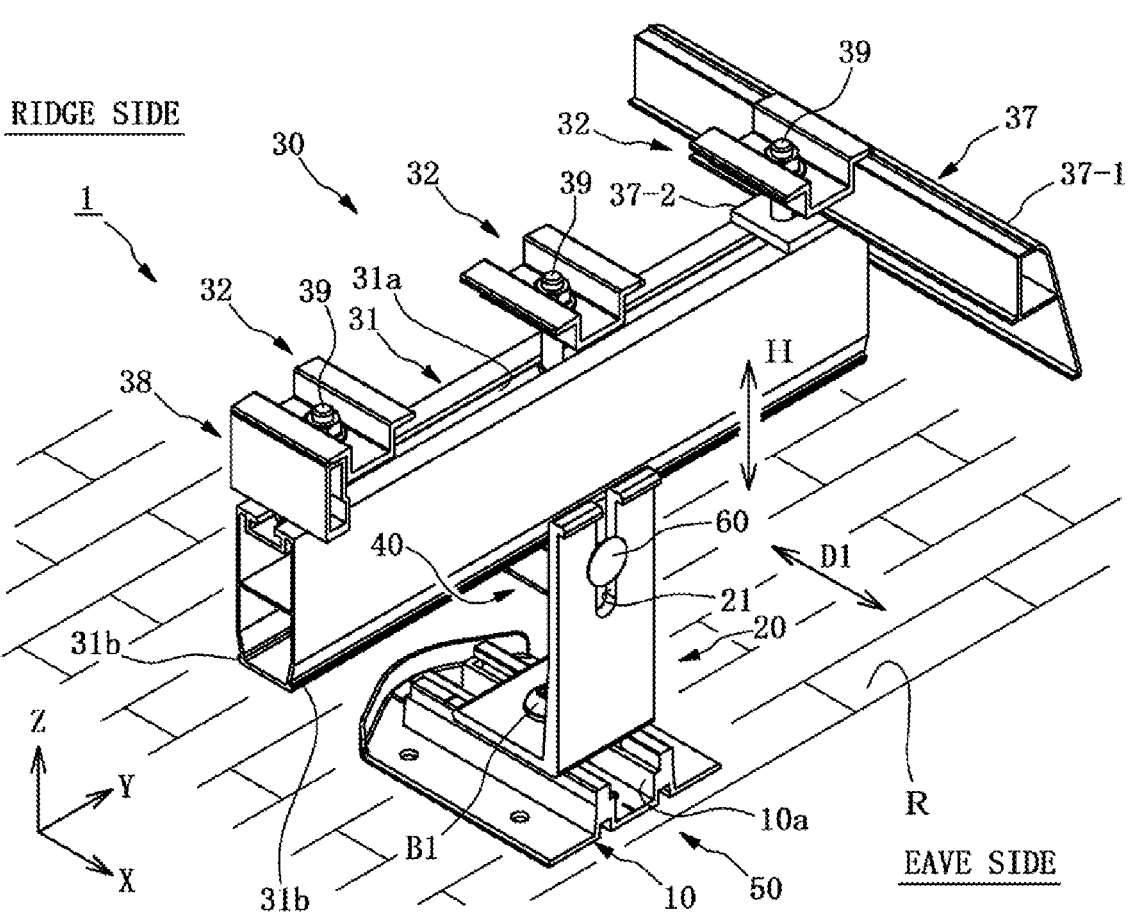
FIG. 1 is a perspective view of a trestle according to Embodiment 1 of the present disclosure.
Figure 2:
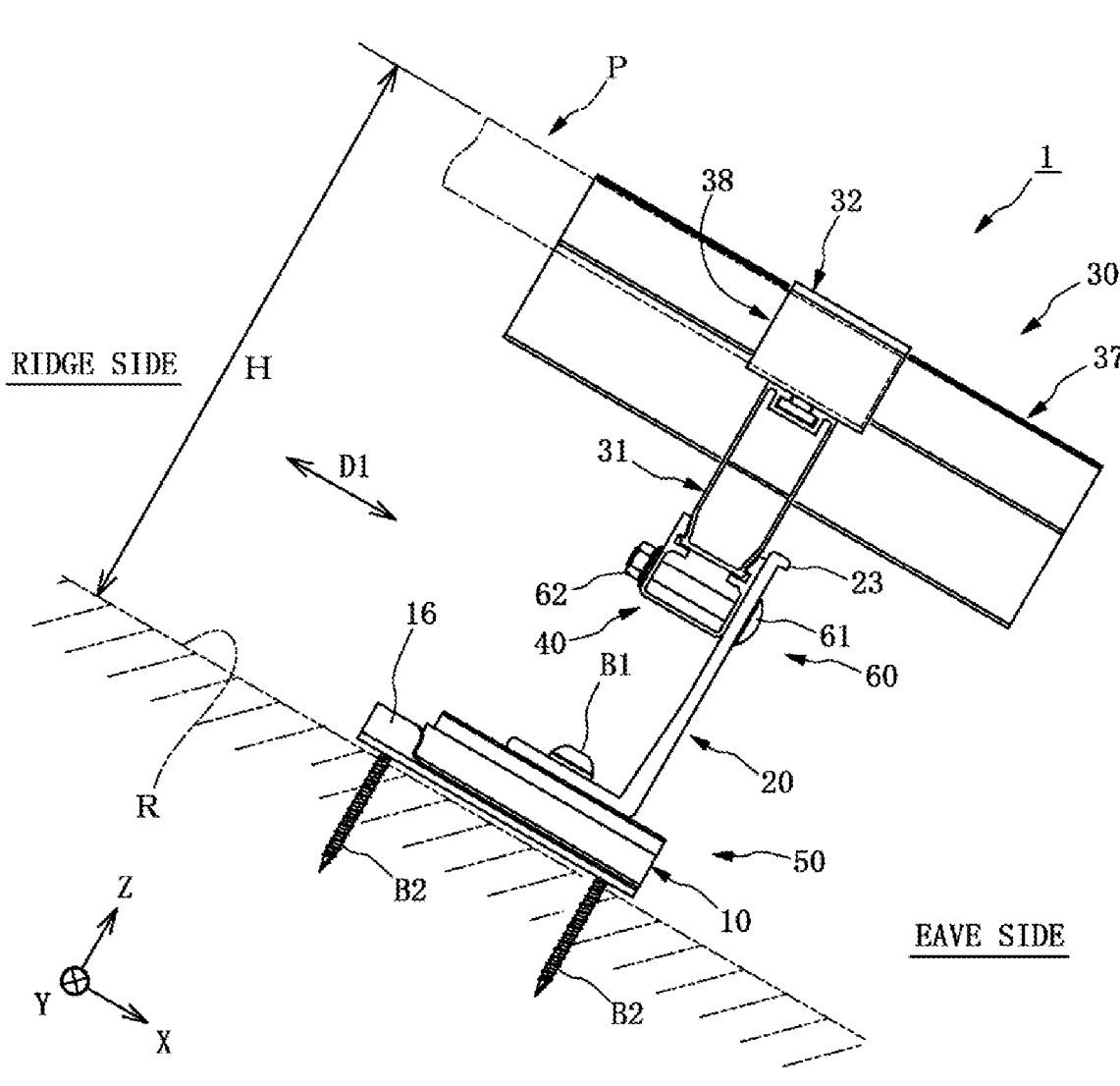
FIG. 2 is a side view of the trestle according to Embodiment 1.

Hereinafter, Embodiment 1 of the present disclosure is described using the drawings. Note that, to facilitate comprehension, mutually orthogonal XYZ coordinates are set and appropriately referenced. An XY plane of the XYZ coordinates is a plane parallel to a roof surface R on which a trestle 1 is installed. A Z-axis direction is a direction parallel to a height direction H from the roof surface R. In Embodiment 1, an eave-ridge direction, which is a direction from a ridge to an eave of a building, is the same direction as an X-axis direction. As illustrated in FIGS. 1 and 2, the trestle 1 is, for example, mounted on the roof surface R of a building and is used to support a solar panel P as an installation object to be installed on the roof surface R. Note that, in Embodiment 1, the building on which the trestle 1 is mounted is a house including eaves and ridges of a roof. The trestle 1 according to Embodiment 1 includes a fixing unit 30, a receiving member 40, a base unit 50, and a first fastener 60.

Figure 3:
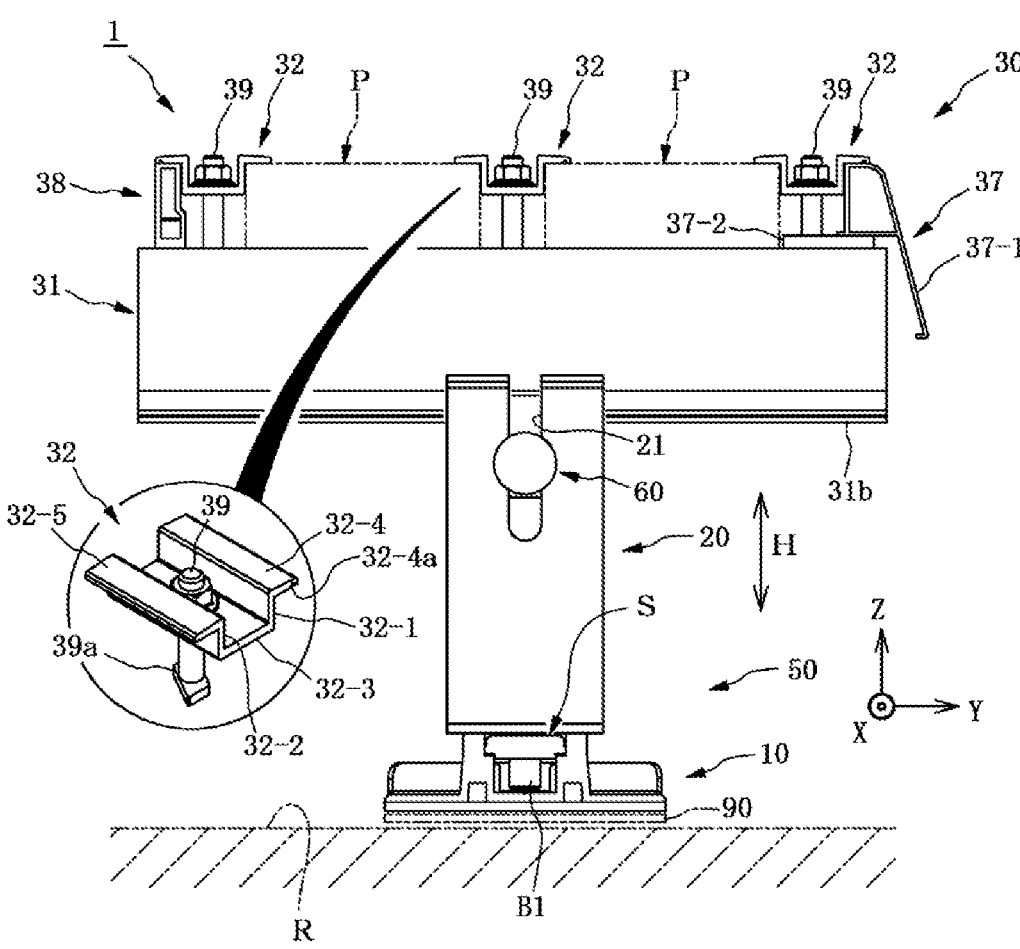
FIG. 3 is a rear view of the trestle according to Embodiment 1.

As illustrated in FIGS. 2 and 3, the fixing unit 30 fixes the solar panel P. The fixing unit 30 is fixed to the receiving member 40 by the first fastener 60. The fixing unit 30 includes an installation object arrangement member 31, a fixing member 32, a cover 37, a fixing member receiving member 38, and a second fastener 39. Each component of the fixing unit 30 is made of metal, for example. However, the present disclosure is not limited thereto. Each component of the fixing unit 30 may be made of a material other than metal. For example, each component of the fixing unit 30 may be made of a highly rigid material such as resin or ceramic. Some of the components of the fixing unit 30 may be made of different materials. However, each component of the fixing unit 30 is preferably made of metal, and all the components of the fixing unit 30 are more preferably made of the same metal material from the viewpoint of manufacturing cost.

Figure 4:
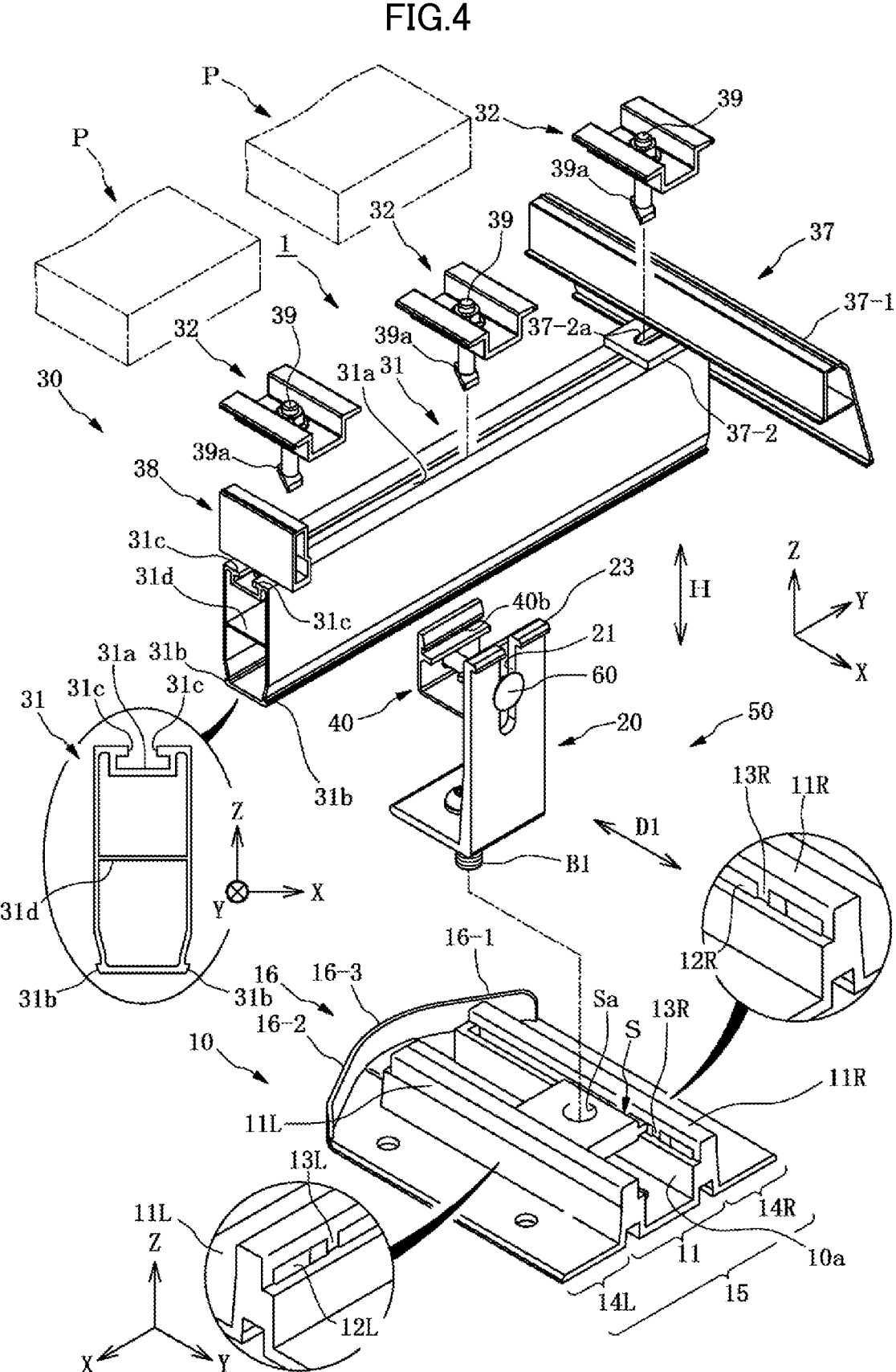
FIG. 4 is an (first) exploded perspective view of the trestle according to Embodiment 1.

In Embodiment 1, the installation object arrangement member 31 is a horizontal bar that extends in a Y-axis direction. The installation object arrangement member 31 is formed so that an XZ cross section of the installation object arrangement member 31 has a rectangular tube shape with the Z-axis direction as a longitudinal direction. The installation object arrangement member 31 is formed by, for example, extruding metal. Specifically, the installation object arrangement member 31 is formed by, for example, extruding aluminum. A fixing member mounting groove 31a is formed on an upper surface on a +Z side of the installation object arrangement member 31 along the Y-axis direction orthogonal to the eave-ridge direction that is a direction from the ridge to the eave of the building. Note that, in Embodiment 1, the installation object arrangement member 31 is a horizontal bar that extends in a direction orthogonal to the eave-ridge direction. However, the present disclosure is not limited thereto. The installation object arrangement member 31 may be a crosspiece other than the horizontal bar. For example, the installation object arrangement member 31 may be a vertical bar that extends in the same direction as the eave-ridge direction. The installation object arrangement member 31 may be a crosspiece other than the horizontal bar or the vertical bar that extends in a direction intersecting the eave-ridge direction. As illustrated in FIG. 4, the installation object arrangement member 31 is provided with a first engager 31b, a second engaged portion 31c, and a partition wall 31d.

The first engager 31b is provided at a lower end on a-Z side of the installation object arrangement member 31. The first engager 31b is formed in a liner shape that extends along the Y-axis direction.

The second engaged portion 31c is provided at an opening above (+Z direction) the fixing member mounting groove 31a.

The partition wall 31d is formed to partition a tube hole of the installation object arrangement member 31 into two. The partition wall 31d is formed in order to enhance the rigidity of the installation object arrangement member 31.

The upper surface on the +Z side of the installation object arrangement member 31 is a surface on which the solar panel P is disposed. The upper surface on the +Z side is formed in a plane parallel to an YZ plane so that the solar panel P is easily disposed.

Figure 5:
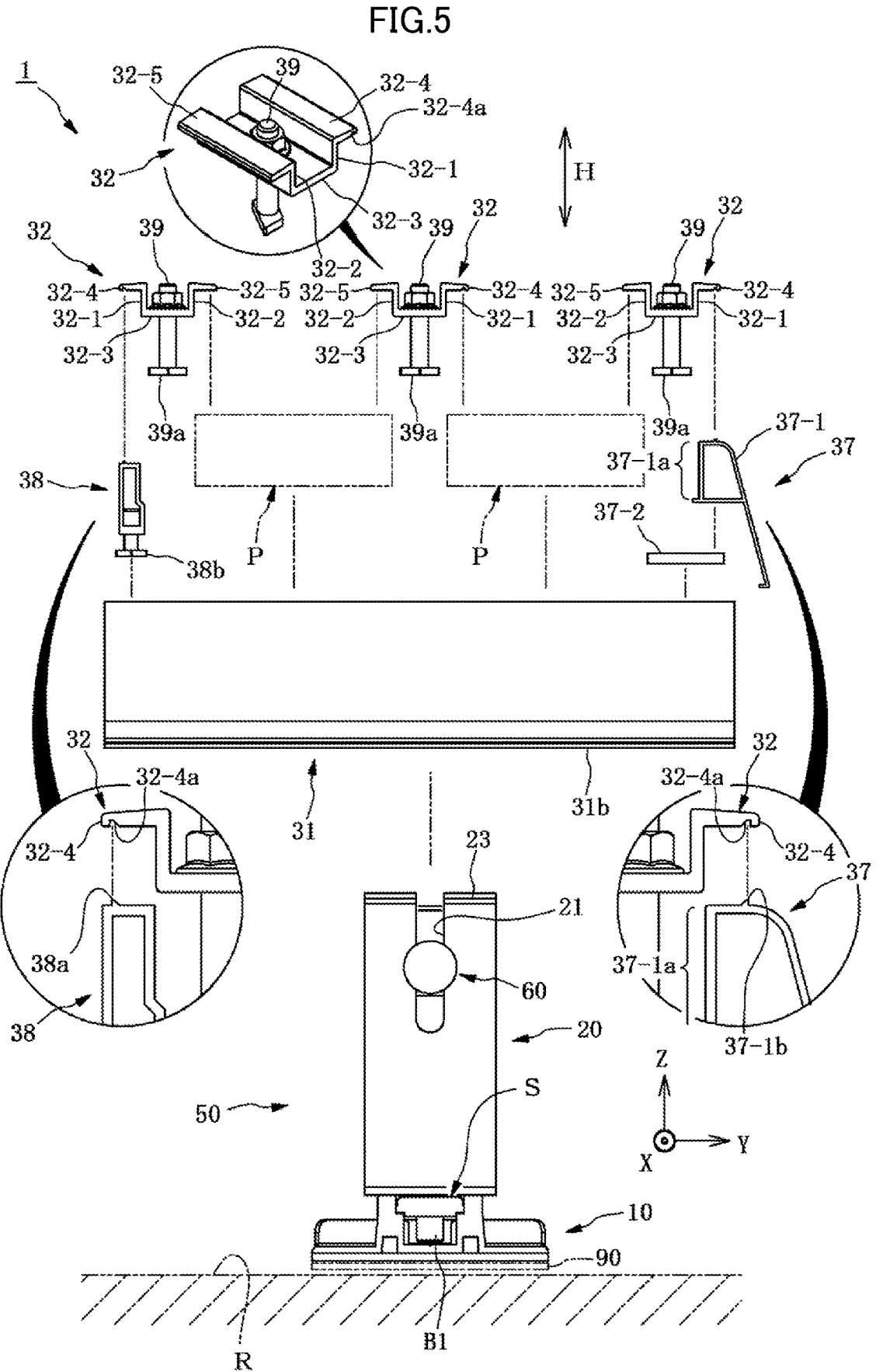
FIG. 5 is an exploded rear view of the trestle according to Embodiment 1.

As illustrated in FIGS. 3 and 5, the fixing member 32 is a bracket that sandwiches the solar panel P disposed on the upper surface of the installation object arrangement member 31 and is fixed to the installation object arrangement member 31. In Embodiment 1, three fixing members 32 are provided to fix two solar panels P. The fixing member 32 includes side walls 32-1 and 32-2, a coupling plate 32-3, and extensions 32-4 and 32-5.

The side walls 32-1 and 32-2 are formed in a plate shape parallel to the YZ plane.

The coupling plate 32-3 is formed in a plate shape parallel to the XY plane. The coupling plate 32-3 couple the side walls 32-1 and 32-2. The coupling plate 32-3 is formed with a hole into which the second fastener 39 is inserted.

The extension 32-4 extends from an upper end (+Z side end) of the side wall 32-1. The extension 32-4 presses any one of the solar panel P, the cover 37, and the fixing member receiving member 38 against the installation object arrangement member 31. An engaged portion 32-4a is formed on a lower surface on the −Z side of the extension 32-4.

The extension 32-5 extends from an upper end (+Z side end) of the side wall 32-2 in a direction opposite to the extending direction of the extension 32-4. The extension 32-5 presses any one of the solar panel P, the cover 37, and the fixing member receiving member 38 against the installation object arrangement member 31. Unlike the extension 32-4, an engaged portion is not formed on a lower surface on the −Z side of the extension 32-5.

The cover 37 covers the +Y side end of the installation object arrangement member 31. The cover 37 is made of an electrically conductive material. The cover 37 is formed by, for example, extruding metal. Specifically, the cover 37 is formed by, for example, extruding aluminum, and, then subjecting the surface of the cover 37 to a black color alumite treatment, so that the silver color that is the color of the aluminum itself is covered. The cover 37 includes a cover main body 37-1 and a spacer 37-2.

As illustrated in FIG. 5, the cover main body 37-1 includes a tubular portion 37-1a having a tubular shape and extending in the Y-axis direction. The tubular portion 37-1a is disposed between the +Z side surface of the installation object arrangement member 31 and the extension 32-4 of the fixing member 32 via the spacer 37-2. An engager 37-1b is formed at an upper end of the tubular portion 37-1a. The engager 37-1b engages the engaged portion 32-4a formed at the extension 32-4 of the fixing member 32.

The spacer 37-2 is formed in a plate shape. The spacer 37-2 is disposed between the cover main body 37-1 and the installation object arrangement member 31, and adjusts the position in the height direction H of the cover main body 37-1 from the installation object arrangement member 31. As illustrated in FIG. 4, the spacer 37-2 is formed with a hole 37-2a penetrating in the Z-axis direction. The second fastener 39 is inserted into the hole 37-2a.

As illustrated in FIGS. 3 and 5, the fixing member receiving member 38 is disposed at a −Y side end of the installation object arrangement member 31, and is pressed by the fixing member 32 to be fixed to the installation object arrangement member 31. The fixing member receiving member 38 is formed so that the height in the Z-axis direction is the same as the height of the solar panel P. As illustrated in FIG. 5, the fixing member receiving member 38 is formed with an engager 38a and a hook portion 38b.

The engager 38a is formed at an upper end of the fixing member receiving member 38. The engager 38a engages the engaged portion 32-4a formed at the extension 32-4 of the fixing member 32.

The hook portion 38b is formed at a lower end of the fixing member receiving member 38. As illustrated in FIGS. 4 and 5, the hook portion 38b is inserted into the fixing member mounting groove 31a from the upper side (+Z side), and is hooked on the second engaged portion 31c formed in the fixing member mounting groove 31a.

As illustrated in FIGS. 3 and 5, the second fastener 39 sandwiches the solar panel P between the installation object arrangement member 31 and the fixing member 32, and fastens the installation object arrangement member 31 and the fixing member 32. The second fastener 39 is formed with a second engager 39a.

Figure 6:
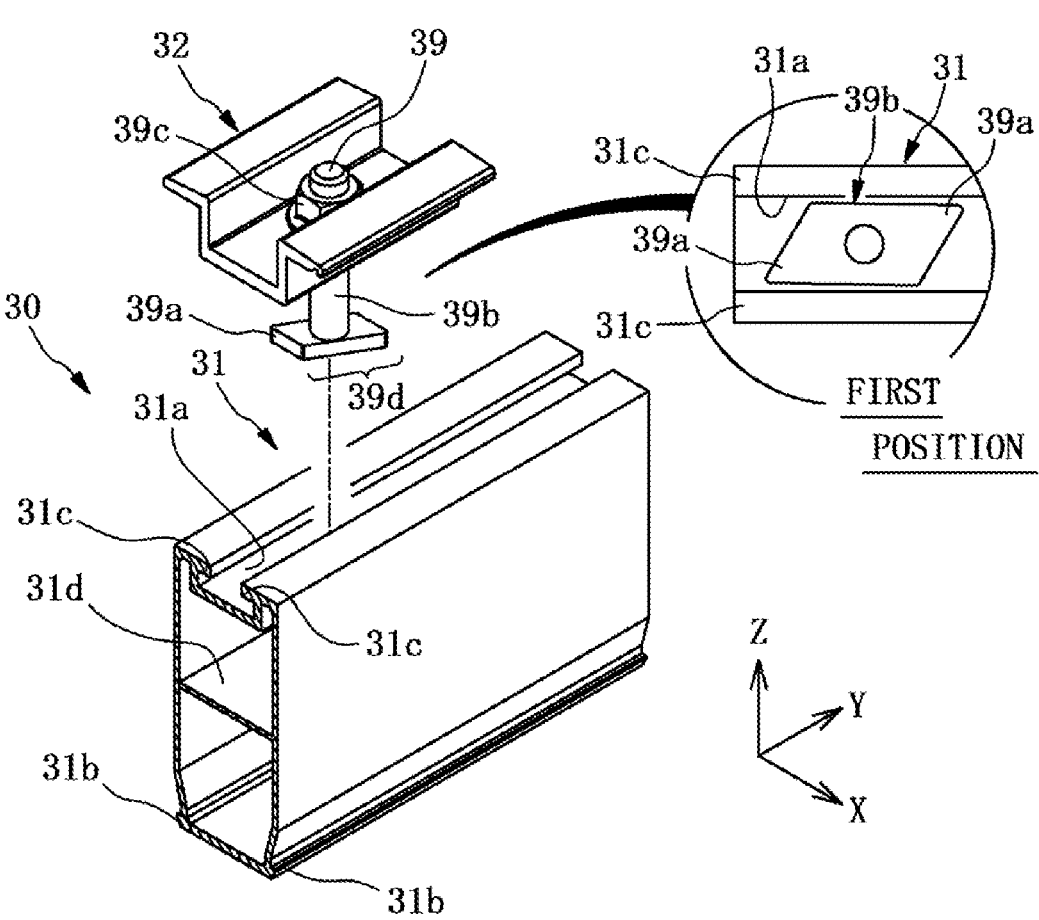
FIG. 6 is an exploded perspective view of a fixing unit according to Embodiment 1.
Figure 7A:
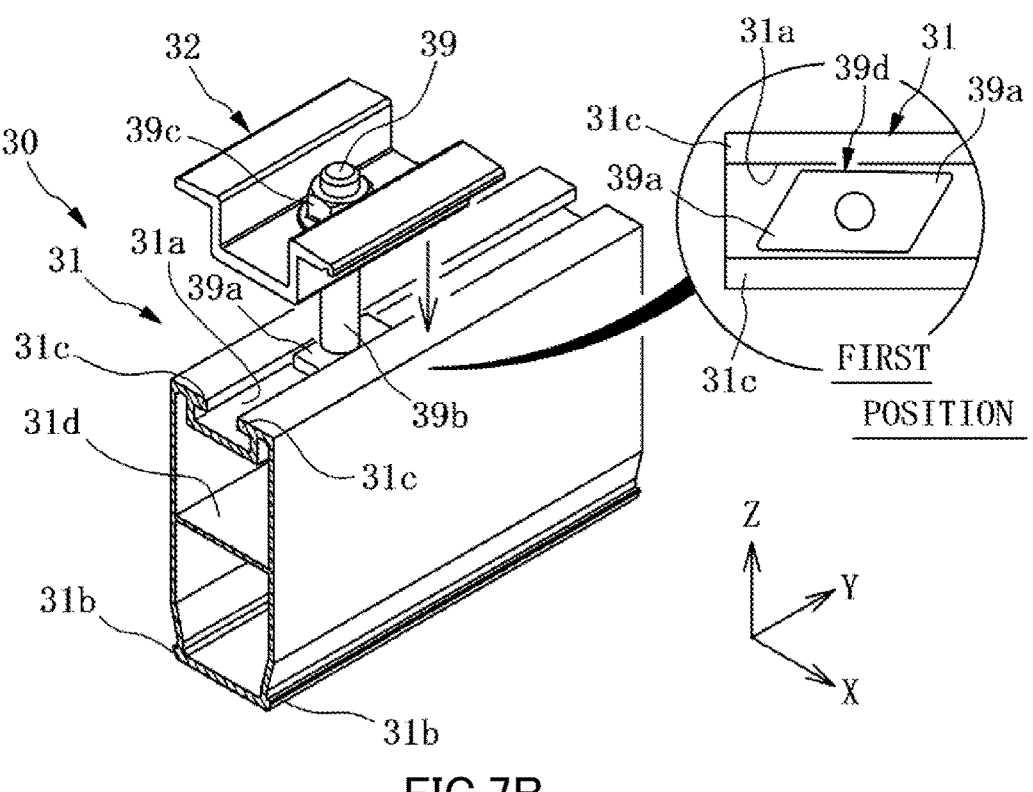
FIG. 7A is an (first) exploded perspective view for explaining the function of the fixing unit of the trestle according to Embodiment 1.
Figure 7B:
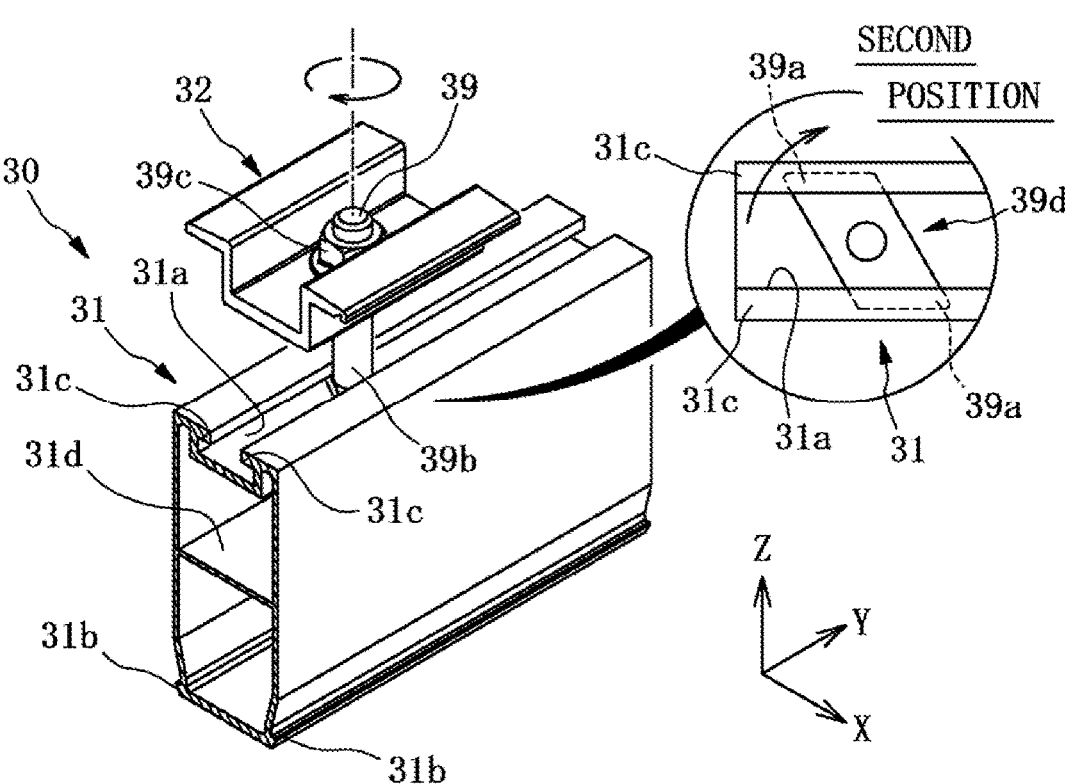
FIG. 7B is an (second) exploded perspective view for explaining the function of the fixing unit of the trestle according to Embodiment 1.

Specifically, as illustrated in FIGS. 6, 7A, and 7B, the second fastener 39 includes a bolt 39b (rhombic bolt) having a bolt head 39d formed in a rhombic portion and a nut 39c. In Embodiment 1, the second engager 39a is provided on the bolt head 39d. The second engager 39a is used to engage the second engaged portion 31c of the fixing member mounting groove 31a. The second fastener 39 is provided on the fixing member 32 so that the bolt head 39d is rotatable around the Z-axis direction. Specifically, the bolt head 39*d* of the second fastener 39 rotates around the Z-axis direction from a first position (see FIGS. 6 and 7A) where the bolt head 39*d* can be inserted into the fixing member mounting groove 31*a* from the upper side (+Z side) to a second position (see FIG. 7B) where the bolt head 39*d* engages the fixing member mounting groove 31*a*. The second engager 39*a* of the bolt head 39*d* rotated to the second position is hooked on the fixing member mounting groove 31*a*.

Figure 8:
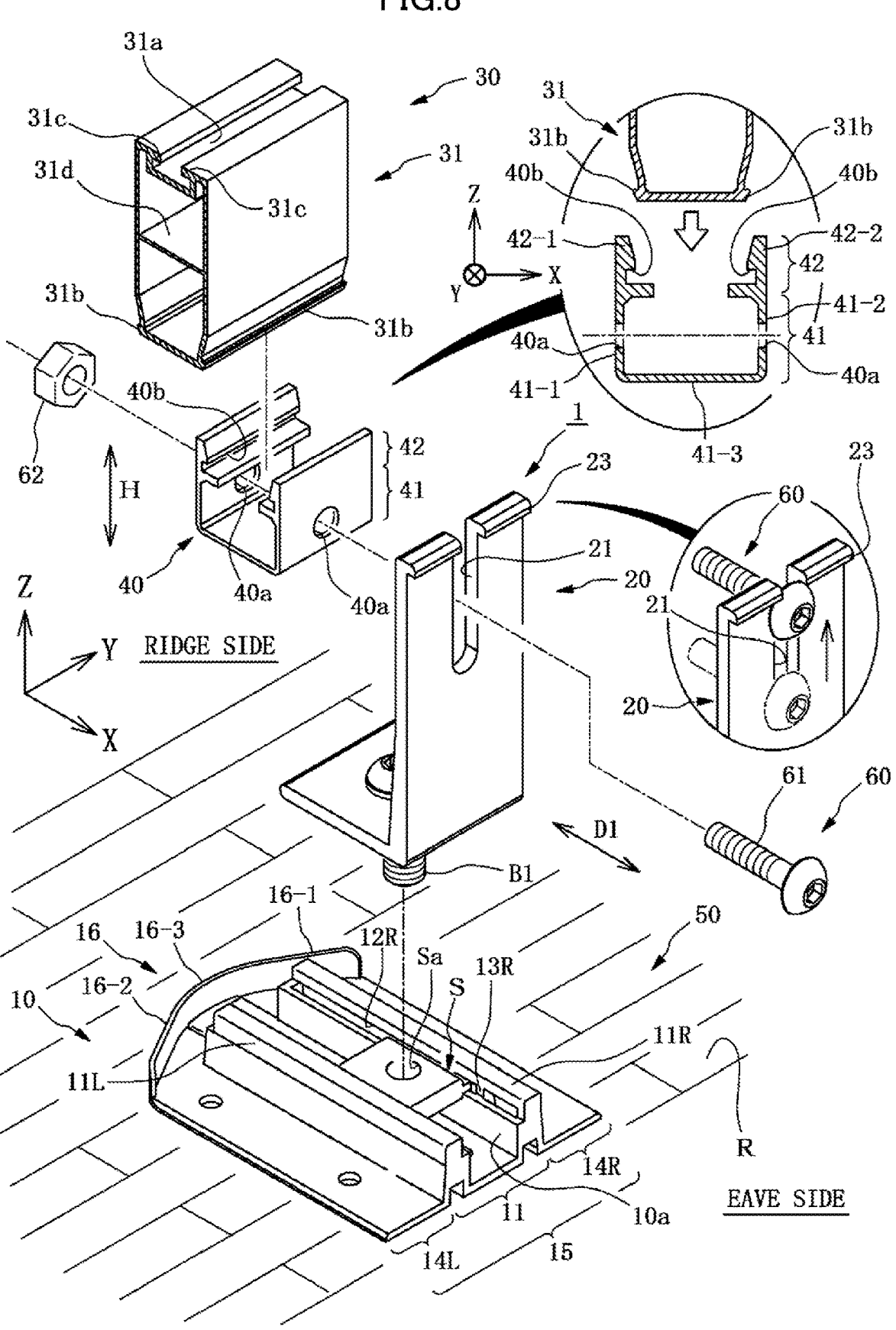
FIG. 8 is an (second) exploded perspective view of the trestle according to Embodiment 1.

As illustrated in FIG. 8, the receiving member 40 receives the fixing unit 30 from below. The receiving member 40 is formed by, for example, extruding metal. Specifically, the receiving member 40 is formed by, for example, extruding aluminum. The receiving member 40 includes a receiving member main body 41 to which the first fastener 60 is attached, and a sandwiching portion 42 provided at an upper end of the receiving member main body 41.

The receiving member main body 41 is formed with a hole 40*a* (inserted portion) into which the first fastener 60 is inserted. The receiving member main body 41 includes side walls 41-1 and 41-2 and a bottom plate 41-3.

The side walls 41-1 and 41-2 are formed in a plate shape parallel to the YZ plane. The hole 40*a* is formed through these side walls 41-1 and 41-2 in the X-axis direction. Of the side walls 41-1 and 41-2, the side wall 41-2 is a portion that contacts and is fixed to the base unit 50 by the first fastener 60.

The bottom plate 41-3 is formed in a plate shape parallel to the XY plane. The bottom plate 41-3 connects lower ends (−Z side ends) of the side walls 32-1 and 32-2.

The sandwiching portion 42 is a portion that sandwiches a lower end of the installation object arrangement member 31 of the fixing unit 30. The sandwiching portion 42 is formed with a first engaged portion 40*b* engaged by the first engager 31*b* of the installation object arrangement member 31. The sandwiching portion 42 includes extensions 42-1 and 42-2 that extend upward (in the +Z direction) from upper ends (+Z side ends) of the side walls 41-1 and 41-2 of the receiving member main body 41. The first engaged portion 40*b* is formed on each of the opposing surfaces where the extension 42-1 and the extension 42-2 face each other.

As illustrated in FIG. 1, the base unit 50 fixes the receiving member 40 to be adjustable in the height direction H from the roof surface R, and supports the fixing unit 30 via the receiving member 40. As illustrated in FIG. 8, the base unit 50 includes a base 10, a slide bracket S (slide member), a support member 20, and a support member mounting fastener B1.

The base 10 is made of metal, for example. Specifically, the base 10 is formed by die casting using a mold, for example. The base 10 includes a base main body 15 and a wall 16.

The base main body 15 is fixed to the roof surface R. The base main body 15 is formed with a first groove 10*a* (support member fixing groove) as a fixing groove used for fixing the support member 20. The base main body 15 includes a groove forming portion 11 formed with the first groove 10*a*, and plate-shaped flange portions 14R and 14L projecting from the groove forming portion 11 in the +Y direction and the −Y direction.

In the groove forming portion 11, the first groove 10*a* is formed along a first direction D1 that is the same direction as the eave-ridge direction. The groove forming portion 11 is provided therein with a pair of side walls 11R and 11L forming the first groove 10*a*.

Figure 9:
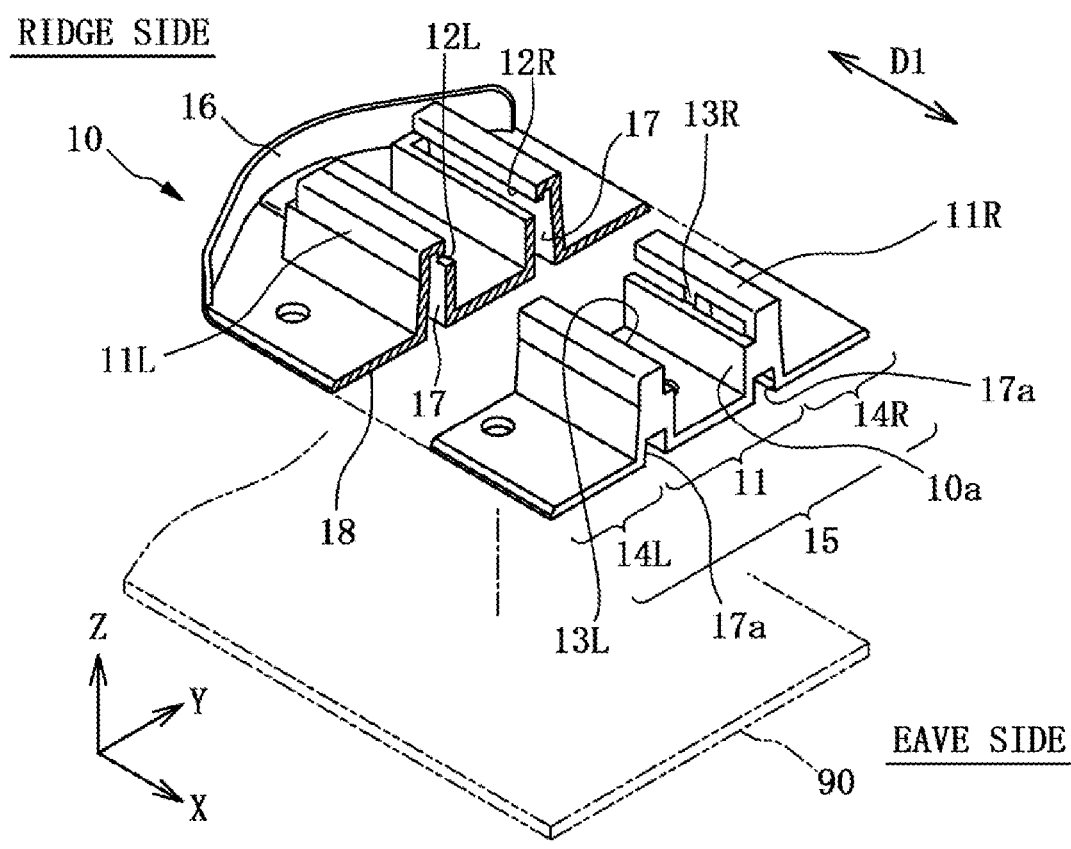
FIG. 9 is a perspective view of a base of the trestle according to Embodiment 1.

As illustrated in FIG. 9, a flowpath 17 is formed in the side walls 11R and 11L, and leads from the first groove 10*a* to a rear surface 18 on the −Z side of the base main body 15. The flowpath 17 is formed as a component where a fluid such as rainwater can flow. Note that the base 10 is used with a sheet 90 made of butyl rubber, for example, affixed to the rear surface 18 thereof. Accordingly, rainwater flowing through the flowpath 17 does not flow out in a downward direction (−Z direction). Discharge ports 17*a* through which the rainwater flowing through the flowpath 17 is discharged from the interior of the side walls 11R and 11L out of the base main body 15 are formed at ridge-side (+X side) ends of the side walls 11R and 11L, respectively. Note that the shape of the sheet 90 made of butyl rubber is an example, and the shape is not limited thereto. Furthermore, the material of the sheet 90 is not limited to butyl rubber, and may be a material other than butyl rubber.

A pair of second grooves 12R and 12L, in which a part of the slide bracket S fits, is formed on respective opposing surfaces of the pair of side walls 11R and 11L.

The second grooves 12R and 12L are formed to extend along the first direction D1 (the eave-ridge direction). Slide restrictors 13R and 13L are formed in the second grooves 12R and 12L. Note that, in Embodiment 1, the slide restrictors 13R and 13L are respectively formed in the second grooves 12R and 12L and, thus, two are formed. However, the present disclosure is not limited thereto. The slide restrictors 13R and 13L may be formed in one of the second grooves 12R and 12L.

The slide restrictors 13R and 13L are formed to restrict sliding, with respect to the base 10, of the slide bracket S in the first direction D1. In Embodiment 1, the slide restrictors 13R and 13L restrict sliding, with respect to the base 10, of the slide bracket S in the +X direction.

Figure 10:
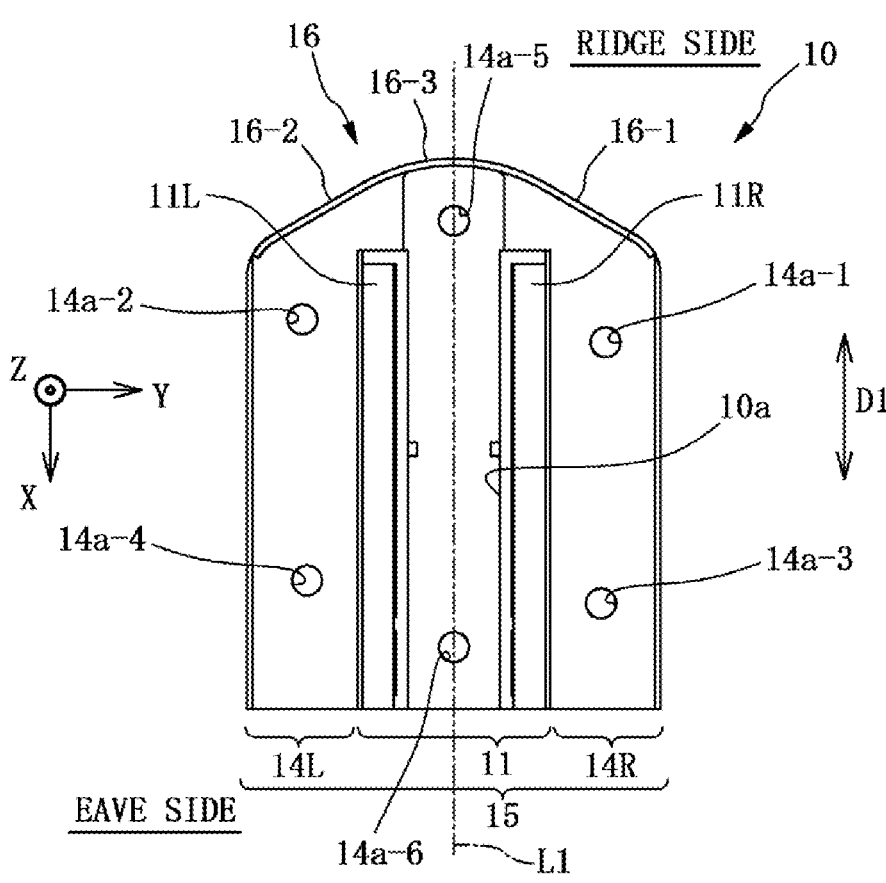
FIG. 10 is a plan view of the base of the trestle according to Embodiment 1.

As illustrated in FIG. 10, fastener insertion holes 14*a*-1 to 14*a*-6 are formed, penetrating in the Z-axis direction, in the flange portions 14R and 14L.

The fastener insertion holes 14*a*-1 to 14*a*-6 are round holes into which base mounting fasteners B2 (see FIG. 2) for mounting the base 10 are inserted.

As illustrated in FIG. 9, the wall 16 is provided at the end toward the ridge (toward the −X side) in the base main body 15, and is formed protruding upward (in the +Z direction) with respect to the XY plane. The wall 16 is formed integrally with the base main body 15 by casting. For example, the wall 16 is used to suppress rainwater flowing from the ridge side from contacting the fasteners inserted into the fastener insertion holes 14*a*-2 and 14*a*-4. A first inclined surface 16-1, a second inclined surface 16-2, and a protruding surface 16-3 are formed on the wall 16.

As illustrated in FIGS. 9 and 10, the first inclined surface 16-1 is formed inclined with respect to the first direction D1.

The second inclined surface 16-2 is a separate inclined surface from the first inclined surface 16-1. The second inclined surface 16-2 is formed inclined with respect to the first direction D1.

The protruding surface 16-3 is provided between the first inclined surface 16-1 and the second inclined surface 16-2. The protruding surface 16-3 is formed protruding in the ridge direction (the −X direction). The protruding surface 16-3 is formed as a curved surface in Embodiment 1.

The base 10 configured in the manner described above is manufactured while integrally forming the base main body 15 and the wall 16 by, for example, performing casting in which at least two dies are opened in an up-down direction (the +Z direction and the −Z direction). However, the present disclosure is not limited thereto, and manufacturing methods other than casting may be used provided that the base main body 15 and the wall 16 can be integrally formed. Among the various casting methods, the base 10 is preferably manufactured by die casting. However, the present disclosure is not limited thereto. The base 10 may be manufactured by casting other than die casting such as casting using sand molds, gypsum molds, resin molds, and lost wax molds.

As illustrated in FIG. 4, the slide bracket S is fitted in the first groove 10a of the base 10 so as to be slidable in the first direction D1. The slide bracket S is attached to the base 10 at a desired position in the first direction D1 to perform positioning of the solar panel P in the first direction D1. For example, the slide bracket S is made of metal and, specifically, is made of metal that is the same material as the base 10. A screw hole Sa is formed on the slide bracket S.

The support member mounting fastener B1 is screwed into the screw hole Sa, and an inner circumferential surface of the screw hole Sa is formed into a female screw surface. The screw hole Sa is formed penetrating in the Z-axis direction.

Figure 11:
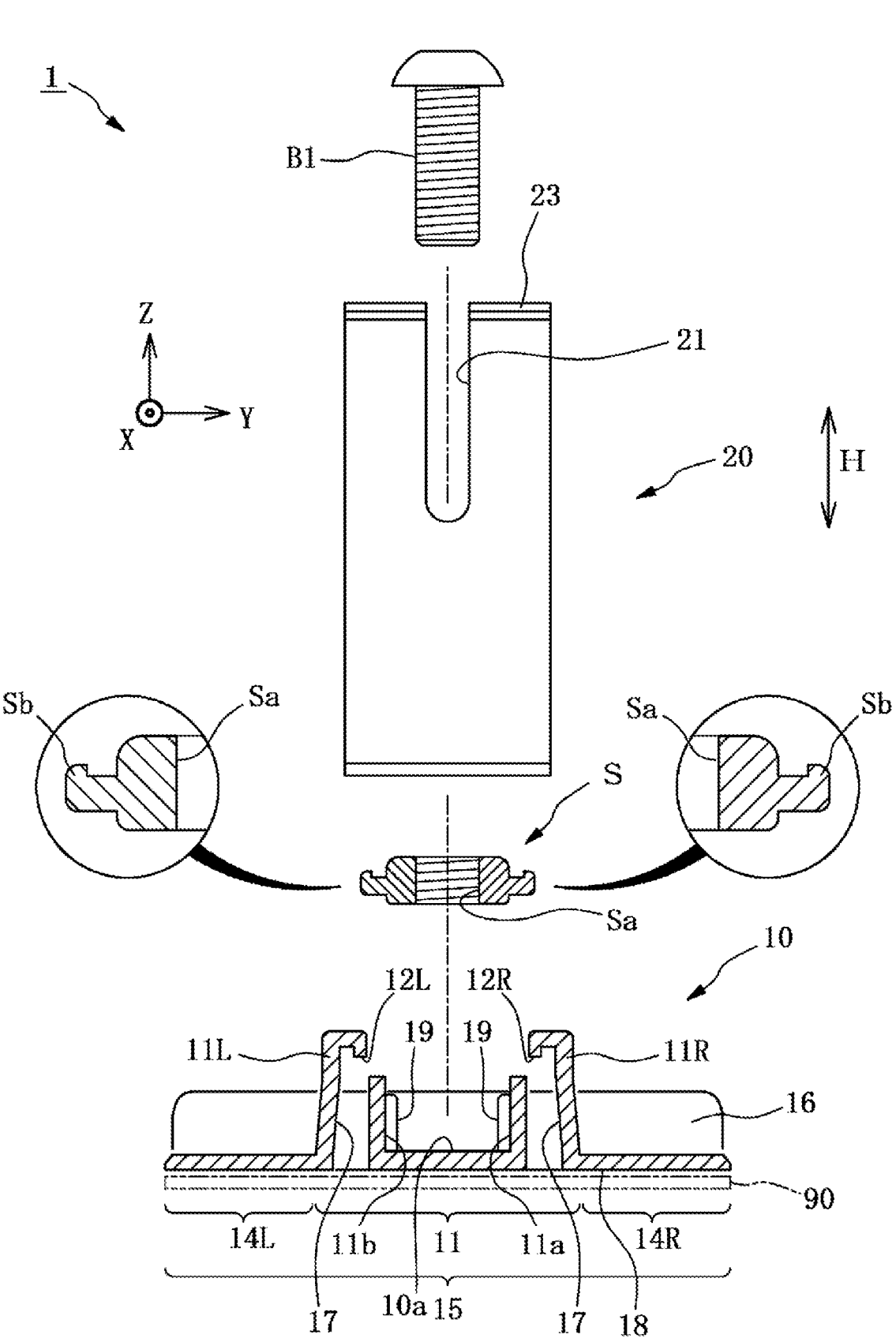
FIG. 11 is an exploded cross-sectional view of the trestle according to Embodiment 1.

As illustrated in FIG. 11, in addition to the screw hole Sa, a pair of fitters Sb is formed on the slide bracket S.

The fitters Sb are portions that fit in the second grooves 12R and 12L formed on the side walls 11R and 11L of the base 10. The fitters Sb are formed such that YZ cross-sections thereof are L-shaped.

As illustrated in FIG. 8, the support member 20 is an L-shaped angle bracket having an L-shaped XZ cross section and supporting the receiving member 40 in the vicinity of an upper end of the L-shape. The support member 20 is fixed to the slide bracket S of the base unit 50. The support member 20 is provided with a height direction adjusting groove 21 (receiving member mounting portion) and a protrusion 23.

The height direction adjusting groove 21 (receiving member mounting portion) is a groove that extends in the height direction H. The height direction adjusting groove 21 is inserted into the first fastener 60. The height direction adjusting groove 21 is used to adjust the position in the height direction H of the receiving member 40.

The protrusion 23 protrudes in the +X direction from an upper end (+Z side end) of the support member 20. The protrusion 23 suppresses the first fastener 60 from detaching from the height direction adjusting groove 21 upward (in the +Z direction) due to the bolt head of the first fastener 60 being caught. In Embodiment 1, the protrusion 23 protrudes in the +X direction from the upper end (+Z side end) of the support member 20. However, the present disclosure is not limited thereto. The protrusion 23 may protrude from the upper end (+Z side end) of the support member 20 in the −X direction opposite to the +X direction. However, when the protrusion 23 protrudes in the −X direction, the protrusion 23 may interfere with the receiving member 40 attached to the support member 20. Therefore, the protrusion 23 preferably protrudes in the +X direction from the upper end (+Z side end) of the support member 20.

As illustrated in FIG. 11, the support member mounting fastener B1 includes a bolt or a screw, for example. The support member mounting fastener B1 is screwed into the screw hole Sa of the slide bracket S. The support member mounting fastener B1 is used to attach the support member 20 to the slide bracket S.

As illustrated in FIG. 8, the first fastener 60 includes a bolt 61 and a nut 62. The bolt 61 includes, for example, a bolt or a screw. In Embodiment 1, the bolt 61 of the first fastener 60 is screwed into the nut 62. However, the present disclosure is not limited thereto. For example, the hole 40a of the receiving member 40 may be a screw hole, and the bolt 61 may be screwed into this hole 40a. In this case, the nut 62 can be omitted, and the first fastener 60 includes only the bolt 61.

A method for constructing the trestle 1 configured as described above is described using the drawings.

When the trestle 1 and the solar panel P are installed on the roof surface R of the building, as illustrated in FIG. 8, a worker, who installs the trestle 1 on the roof surface R, first mounts the base 10, the slide bracket S, and the support member 20 to the roof surface R in this order. The base 10 is fixed to the roof surface R by the base mounting fasteners B2. The support member 20 is fixed to the slide bracket S by the support member mounting fastener B1.

Figure 12:
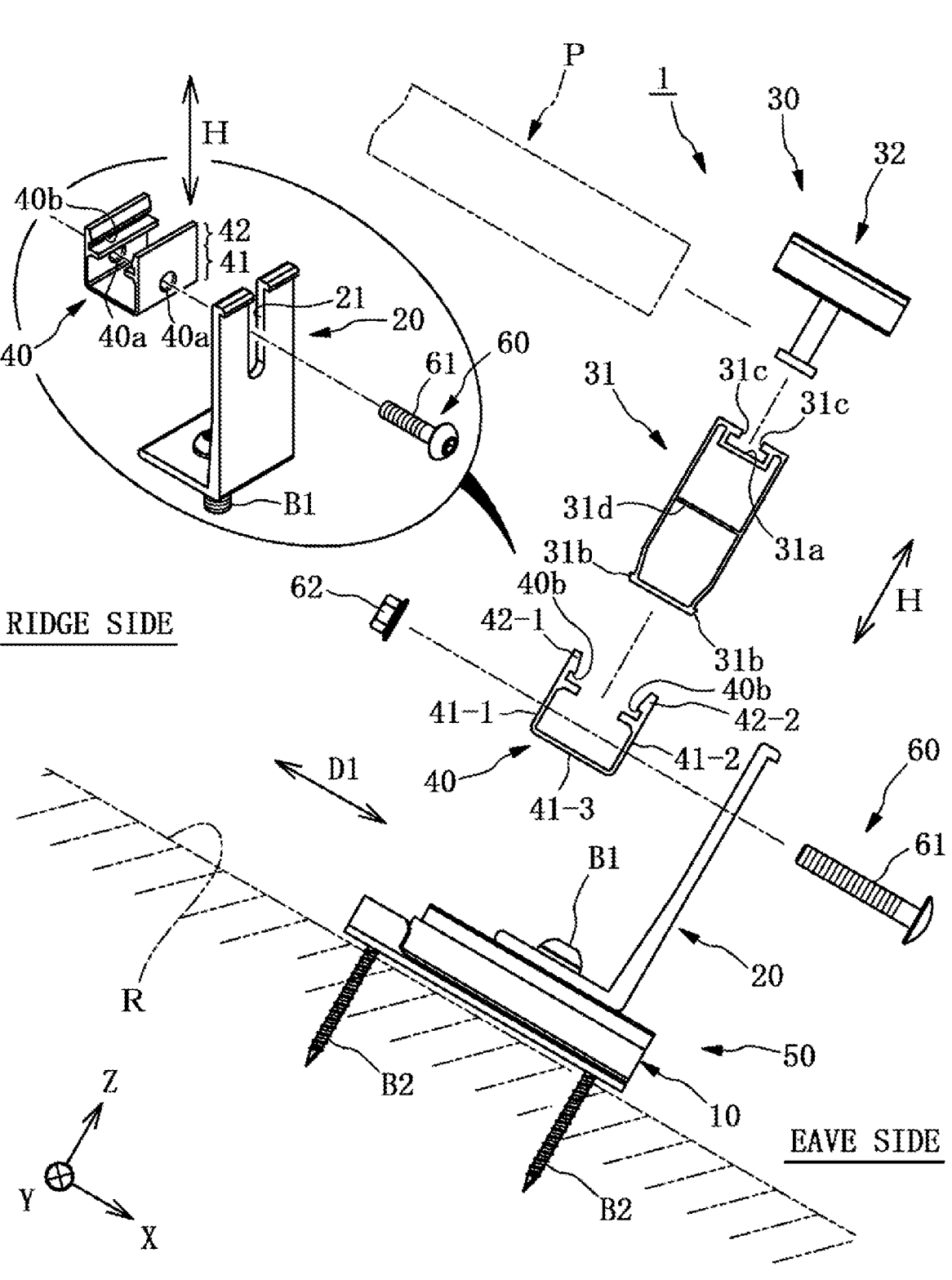
FIG. 12 is an (first) exploded side view of the trestle according to Embodiment 1.

Subsequently, as illustrated in FIG. 12, the worker temporarily fixes the receiving member 40 to the support member 20 by using the first fastener 60.

Figure 13:
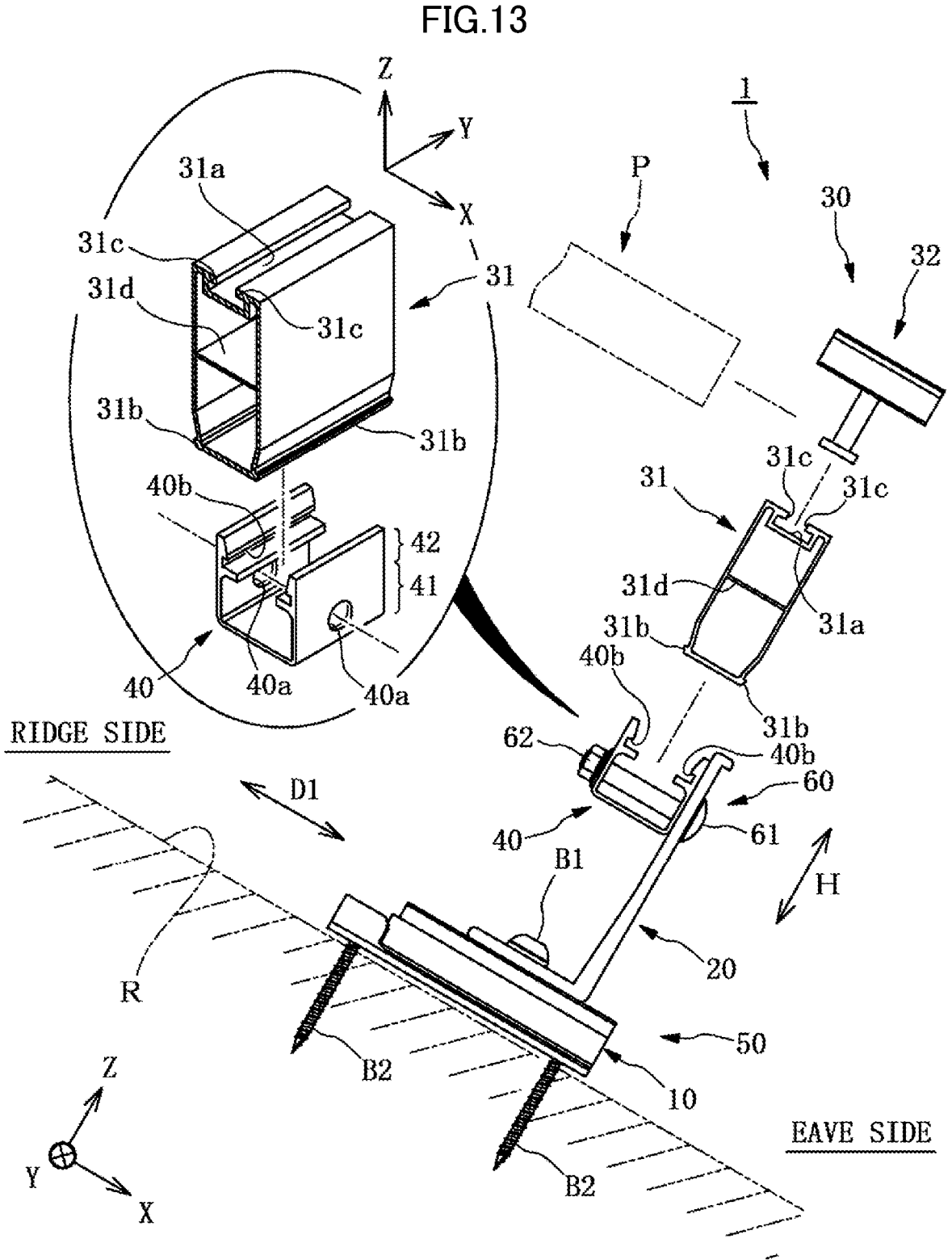
FIG. 13 is an (second) exploded side view of the trestle according to Embodiment 1.

Subsequently, as illustrated in FIG. 13, the worker fits the installation object arrangement member 31, on which the solar panel P is not mounted, into the receiving member 40 from the +Z side (upper side). When the installation object arrangement member 31 is fitted into the receiving member 40, the first engager 31b of the installation object arrangement member 31 engages the first engaged portion 40b of the receiving member 40.

Subsequently, the worker adjusts a height level from the roof surface R to the upper end of the installation object arrangement member 31 to be a height level desired by the worker. Subsequently, the worker fixes the receiving member 40 to the support member 20 by using the first fastener 60.

Subsequently, as illustrated in FIG. 4, the worker places the solar panel P, the cover 37 having the spacer 37-2, and the fixing member receiving member 38 on the upper surface of the installation object arrangement member 31. Subsequently, the worker fixes the solar panel P, the cover 37 and the fixing member receiving member 38 to the installation object arrangement member 31 by using the plurality of fixing members 32. At this time, the solar panel P can be firmly fixed by adjusting the positions of the plurality of fixing members 32 along the fixing member mounting groove 31a.

As described above, as illustrated in FIG. 3, the work of installing the trestle 1 and the solar panel P on the roof surface R of the building is completed.

As described above, as illustrated in FIGS. 1 and 4, the trestle 1 according to Embodiment 1 includes the first fastener 60. The first fastener 60 fixes the receiving member 40 to the base unit 50, and sandwiches the lower end (−Z side end) of the installation object arrangement member 31 of the fixing unit 30 in the sandwiching portion 42 of the receiving member 40. Therefore, as illustrated in FIG. 14, in the trestle 1 according to Embodiment 1, the receiving member 40 can be fixed to the base unit 50 and the fixing unit 30 can be fixed to the receiving member 40 only by the first fastener 60.

Figure 15:
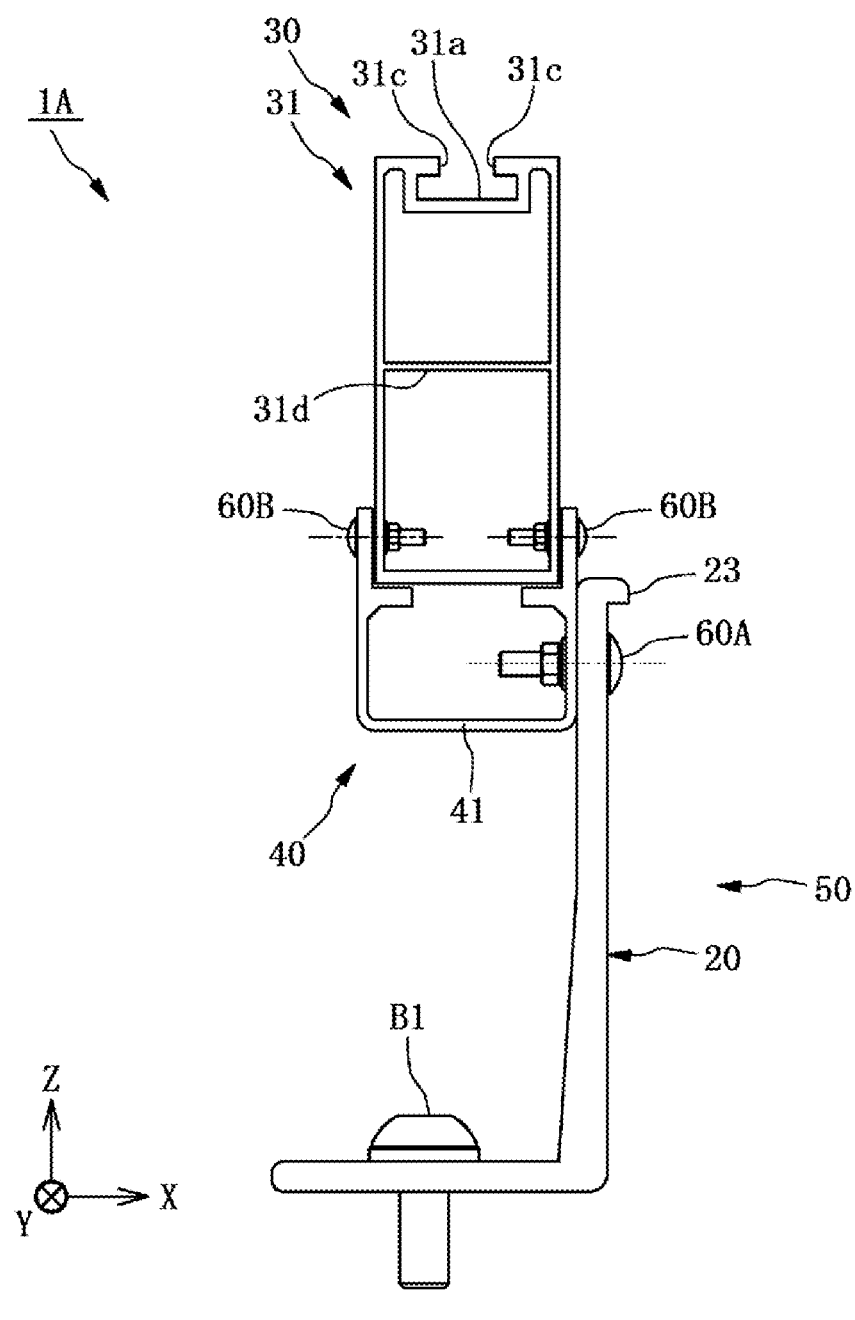
FIG. 15 is a side view of a trestle according to Comparative Example 1.

For example, as illustrated in FIG. 15, in a trestle 1A according to Comparative Example 1, a fastener 60A fixes the receiving member 40 to the base unit 50, and another fastener 60B fixes the installation object arrangement member 31 of the fixing unit 30 to the receiving member 40. Therefore, in the trestle 1A according to Comparative Example 1, the fixing unit 30 is fixed to the base unit 50 via the receiving member 40 by the two fasteners 60A and 60B. Accordingly, in the trestle 1A according to Comparative Example 1, since a plurality of works of a work of screwing the fastener 60A and a work of screwing the fastener 60B needs to be performed and the efficiency of attachment work of the base unit 50, the receiving member 40, and the fixing unit 30 is low, there is room for improvement.

Figure 14:
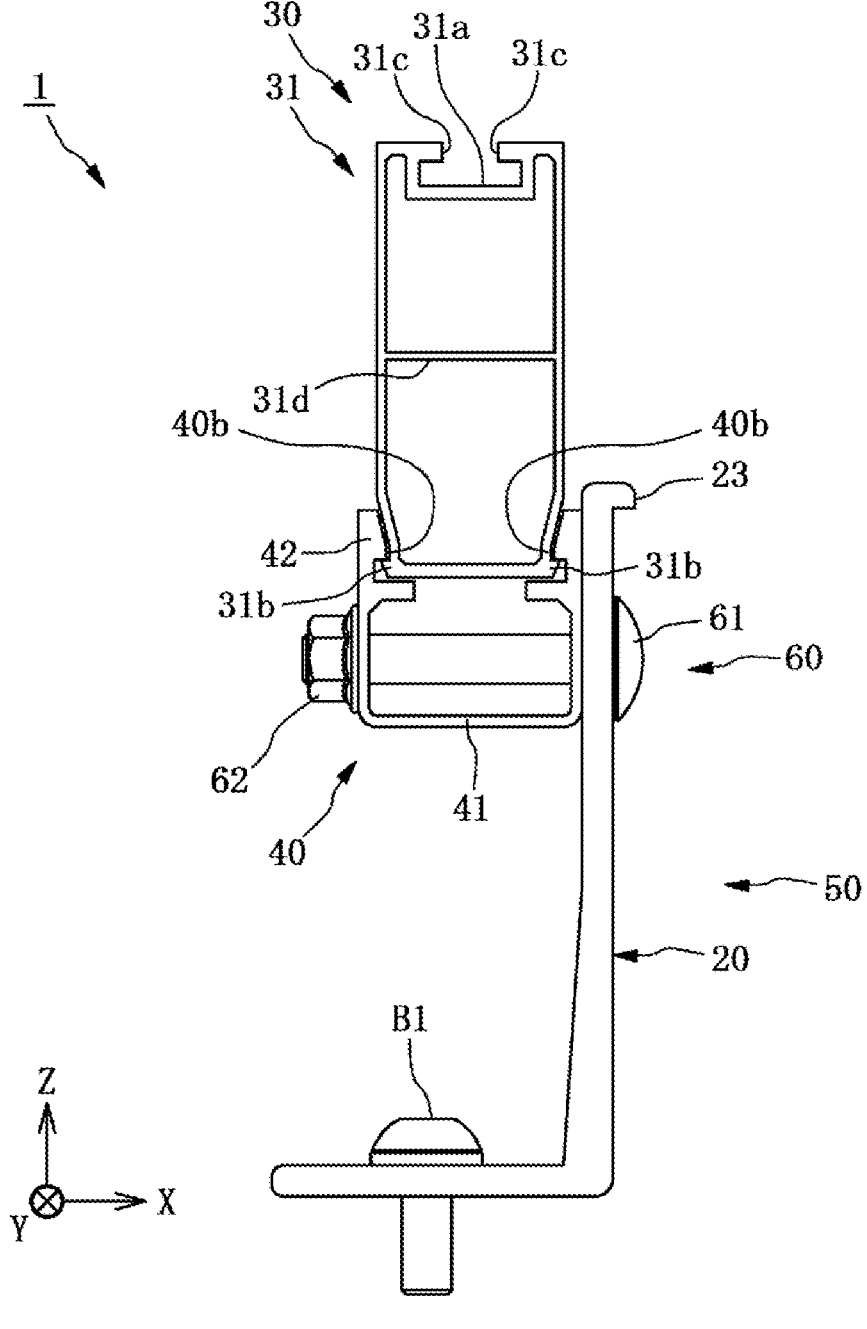
FIG. 14 is a side view for explaining the effects of the trestle according to Embodiment 1.

On the other hand, in the trestle 1 according to Embodiment 1, as illustrated in FIG. 14, the receiving member 40 can be fixed to the base unit 50 and the fixing unit 30 can be fixed to the receiving member 40 only by the first fastener 60. As a result, the trestle 1 can enhance the work efficiency of installation on a building.

Furthermore, in the trestle 1 according to Embodiment 1, as illustrated in FIGS. 12 and 13, the installation object arrangement member 31 is once fitted into the receiving member 40 from the +Z side (upper side), and then the height level of the installation object arrangement member 31 can be adjusted. Subsequently, the receiving member 40 can be fixed to the support member 20 by using the first fastener 60. Therefore, the trestle 1 can enhance the accuracy of adjustment of the height level of the installation object arrangement member 31. As a result, the trestle 1 can enhance the working efficiency of installation on a building.

Furthermore, in the trestle 1 according to Embodiment 1, the receiving member 40 includes the sandwiching portion 42 that sandwiches the lower end of the installation object arrangement member 31 of the fixing unit 30 between the extension 42-1 and the extension 42-2. The sandwiching portion 42 makes it difficult for the installation object arrangement member 31 to detach from the sandwiching portion 42 even when a force is applied from the outside. As a consequence, the fixing unit 30 is less likely to detach from the receiving member 40 in the trestle 1.

Furthermore, in the trestle 1 according to Embodiment 1, the fixing unit 30 is formed with the first engager 31b, and the first engager 31b engages the receiving member 40, so that the first engaged portion 40b is formed to suppress the fixing unit 30 from detaching from the receiving member 40 upward (in the +Z direction). Therefore, in the trestle 1, the fixing unit 30 can be easily fitted into the receiving member 40 from above (in the +Z direction), and the fixing unit 30 is suppressed from detaching from the receiving member 40 upward (in the +Z direction). As a result, the trestle 1 can enhance the work efficiency of installation on a building.

Figure 16:
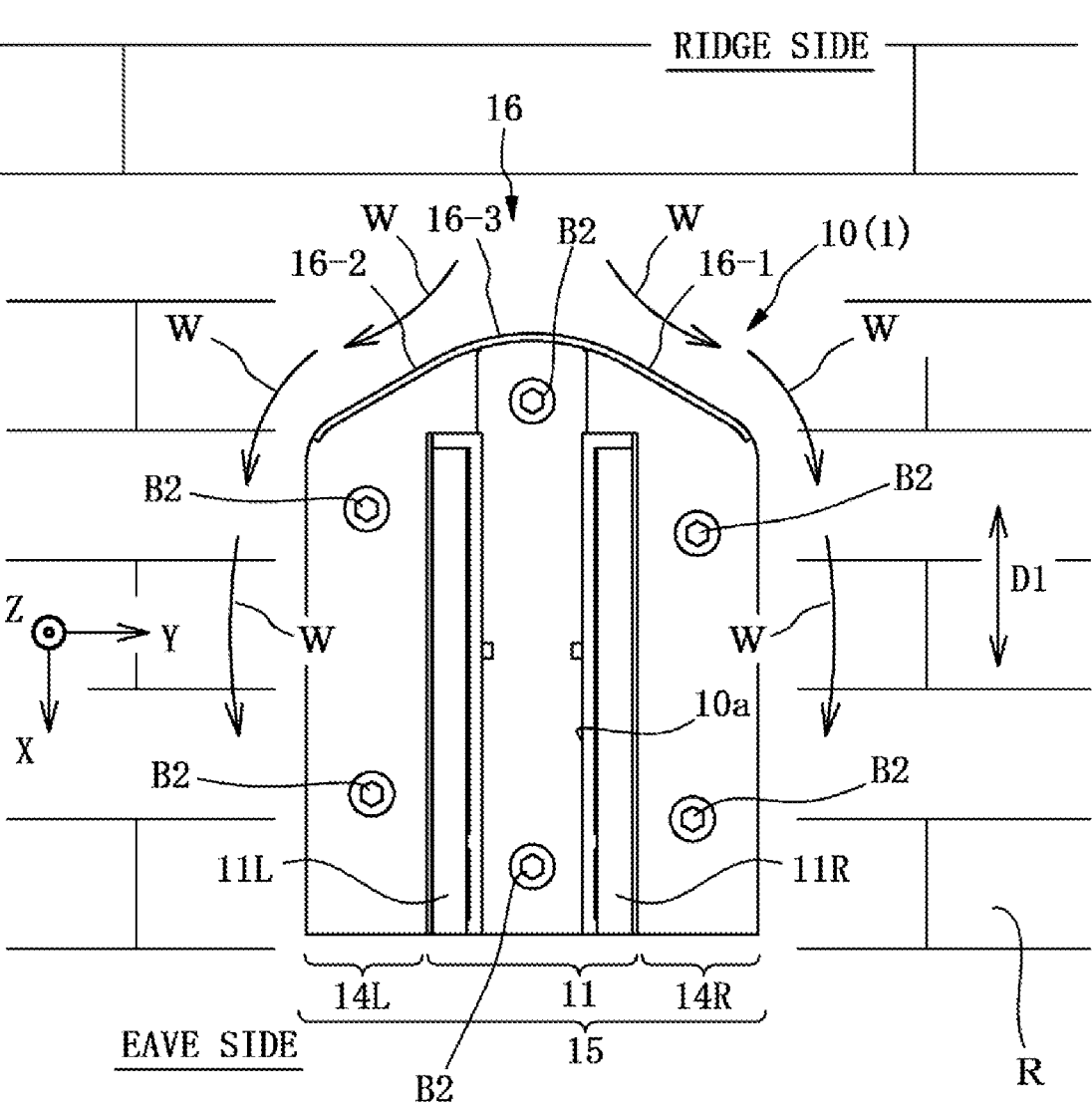
FIG. 16 is a plan view for explaining the effects of the base of the trestle according to Embodiment 1.

Furthermore, the base 10 of the trestle 1 according to Embodiment 1 includes the wall 16 that is provided at the end toward the ridge (toward the −X side) in the base main body 15 and formed protruding in the +Z direction with respect to the roof surface R of the building. As illustrated in FIG. 16, the wall 16 can direct rainwater W flowing from the ridge side in the eave direction (+X direction) while dividing the rainwater W to the left and right, namely, to the −Y side and the +Y side. Therefore, the rainwater W flowing on the roof surface R of the building can be suppressed from contacting the base mounting fasteners B2 that mount the trestle 1 to the roof surface R. As a result, the base 10 according to Embodiment 1 can suppress deterioration of the base mounting fasteners B2 caused by the rainwater W. For example, when the base mounting fasteners B2 are made of wood, rotting of the base mounting fasteners B2 can be suppressed from progressing. By extension, the base 10 according to Embodiment 1 can suppress deterioration of the base mounting fasteners B2 caused by the rainwater W. As a consequence, the base 10 according to Embodiment 1 can suppress reductions in the fixing force of the trestle 1 to the roof surface R.

Furthermore, the base 10 of the trestle 1 according to Embodiment 1 is formed by die casting. Therefore, in Embodiment 1, the manufacturing cost of the base 10 can be suppressed compared to a case in which the base 10 is manufactured by extruding metal such as aluminum, or by press-molding a metal plate.

Furthermore, the base 10 of the trestle 1 according to Embodiment 1 is formed by die casting. Therefore, as illustrated in FIG. 16, in the base 10 of the trestle 1 according to Embodiment 1, the wall 16 can be formed at a position in the base main body 15 where it is easiest to prevent the rainwater W from contacting the base mounting fasteners B2. Furthermore, in Embodiment 1, the base 10 can be formed in a shape that protrudes in the +Z direction with respect to the roof surface R.

Furthermore, in the base 10 of the trestle 1 according to Embodiment 1, the wall 16 is formed integrally with the base main body 15. Therefore, due to the base main body 15 and the wall 16 being formed as separate bodies, the wall 16 is easier to dispose at a desired position on the roof surface R regardless of the skill of a worker in Embodiment 1 than in a case in which the base main body 15 is mounted on the roof surface R and then the wall 16 is attached to the base main body 15. As a consequence, in Embodiment 1, the work efficiency of installing the base 10 on the roof surface R of the building can be improved.

Furthermore, in Embodiment 1, as illustrated in FIG. 4, the slide restrictors 13R and 13L are formed on the second grooves 12R and 12L formed on the respective opposing surfaces of the pair of side walls 11R and 11L. Therefore, the slide restrictors 13R and 13L restrict sliding in the +X direction of the slide bracket S and the fixing unit 30 with respect to the base 10. As a consequence, the trestle 1 according to Embodiment 1 can improve the work efficiency when carrying out installation/removal work on the roof surface R of a house.

Embodiment 2

Figure 17:
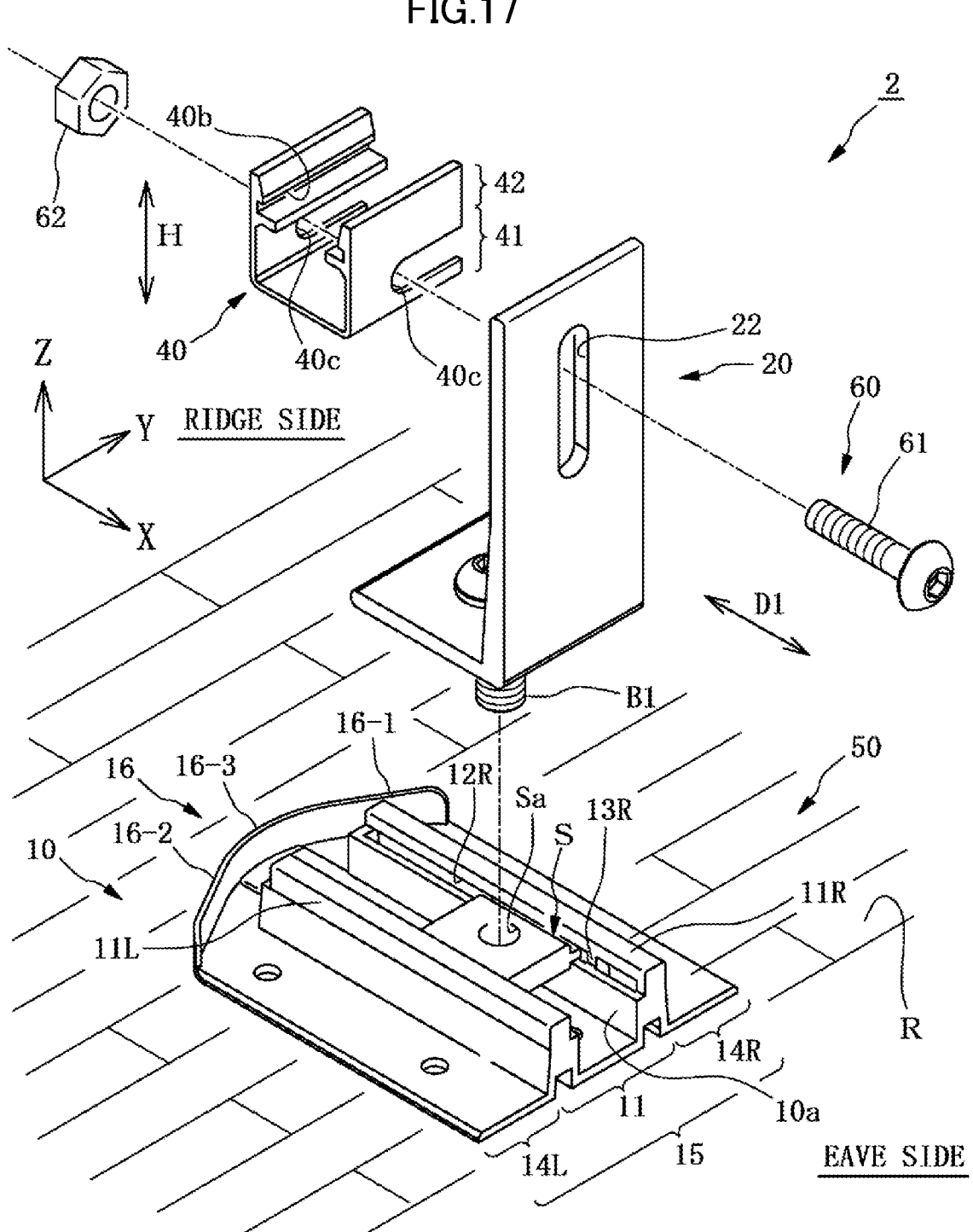
FIG. 17 is an exploded perspective view of a trestle according to Embodiment 2.

In Embodiment 1 above, as illustrated in FIG. 8, the height direction adjusting groove 21 is formed in the support member 20 of the base unit 50 of the trestle 1 as a receiving member mounting portion for fixing the receiving member 40. However, the present disclosure is not limited thereto. The receiving member mounting portion may have a shape other than a groove such as the height direction adjusting groove 21. For example, as in a trestle 2 illustrated in FIG. 17, a receiving member mounting portion formed in the support member 20 may be a hole 22 that is an oblong circular hole. In this case, unlike the height direction adjusting groove 21 according to Embodiment 1, the first fastener 60 does not detach from the support member 20 upward (in the +Z direction). Therefore, in Embodiment 2, the protrusion 23 provided on the support member 20 illustrated in FIG. 8 can be eliminated.

Furthermore, in Embodiment 1 above, as illustrated in FIG. 8, the hole 40a is formed in the receiving member 40 of the trestle 1 as an inserted portion into which the first fastener 60 is inserted. However, the present disclosure is not limited thereto. The inserted portion may have a shape other than the hole 40a. For example, like the trestle 2 illustrated in FIG. 17, the inserted portion formed in the receiving member 40 may be a notch 40c into which the first fastener 60 is inserted.

Also in the trestle 2 according to Embodiment 2, effects equivalent to the effects of Embodiment 1 are obtained.

Embodiment 3

In Embodiment 1 above, as illustrated in FIGS. 6 and 7, the rhombic portion of the second fastener 39 is provided with the second engager 39a that engages the second engaged portion 31c of the fixing member mounting groove 31a. As a result, the second fastener 39 has a function of fixing the fixing member 32 to the fixing member mounting groove 31a. However, the present disclosure is not limited thereto. As in Embodiment 3 illustrated in FIG. 18, the second fastener 39 may have a function of sliding the fixing member 32 along the fixing member mounting groove 31a, in addition to the function of fixing the fixing member 32 to the fixing member mounting groove 31a. Hereinafter, a trestle 3 according to Embodiment 3 is described using the drawings. The following description focuses on the differences with Embodiment 1. With the exception of these differences, the trestle 3 according to Embodiment 3 is the same as or equivalent to the trestle 1 of Embodiment 1. Note that, to facilitate comprehension, XYZ coordinates are set and appropriately referenced.

The trestle 3 according to Embodiment 3 includes the fixing unit 30, the receiving member 40, the base unit 50, and the first fastener 60.

Figure 18:
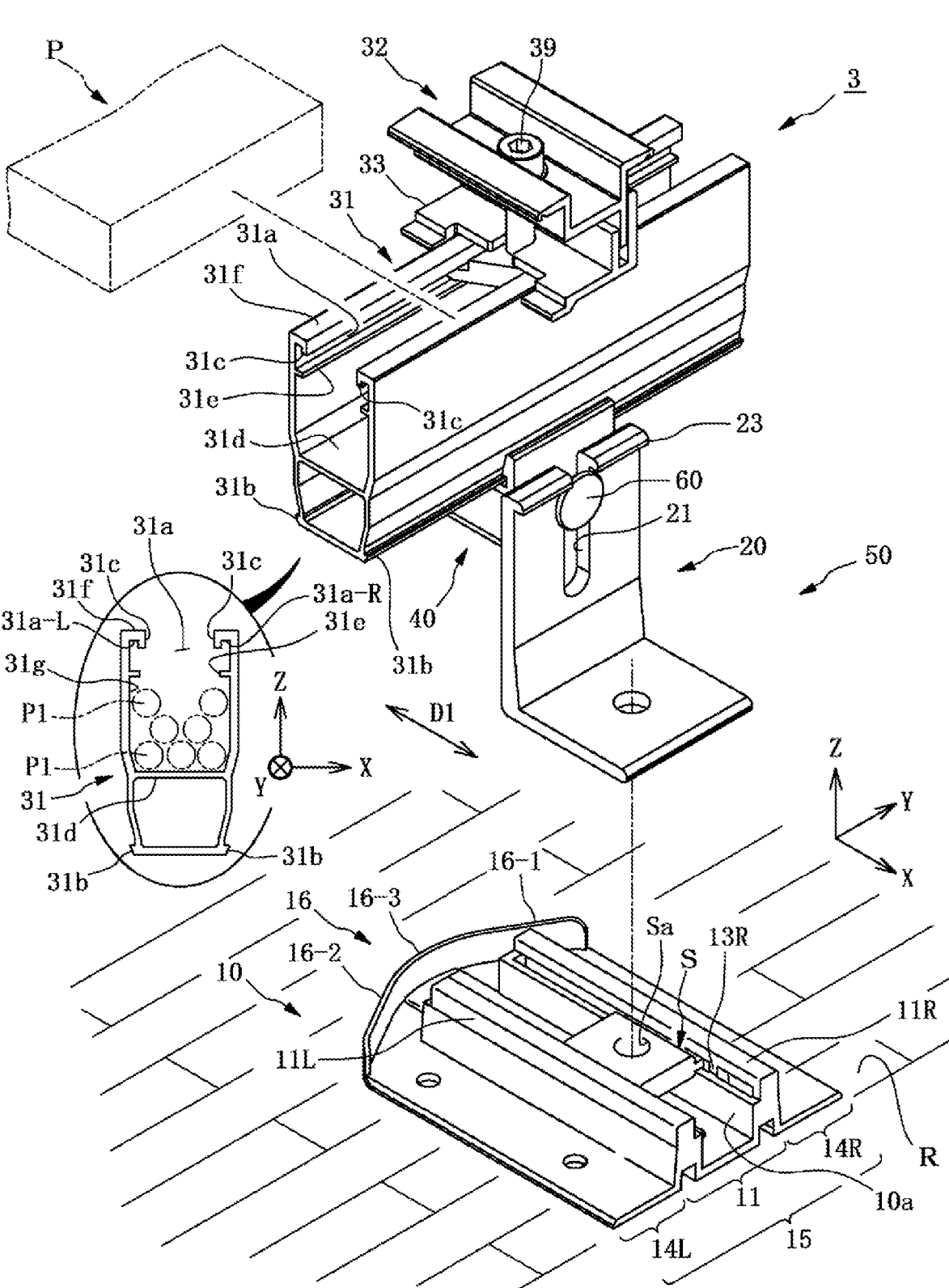
FIG. 18 is a perspective view of a trestle according to Embodiment 3.
Figure 19:
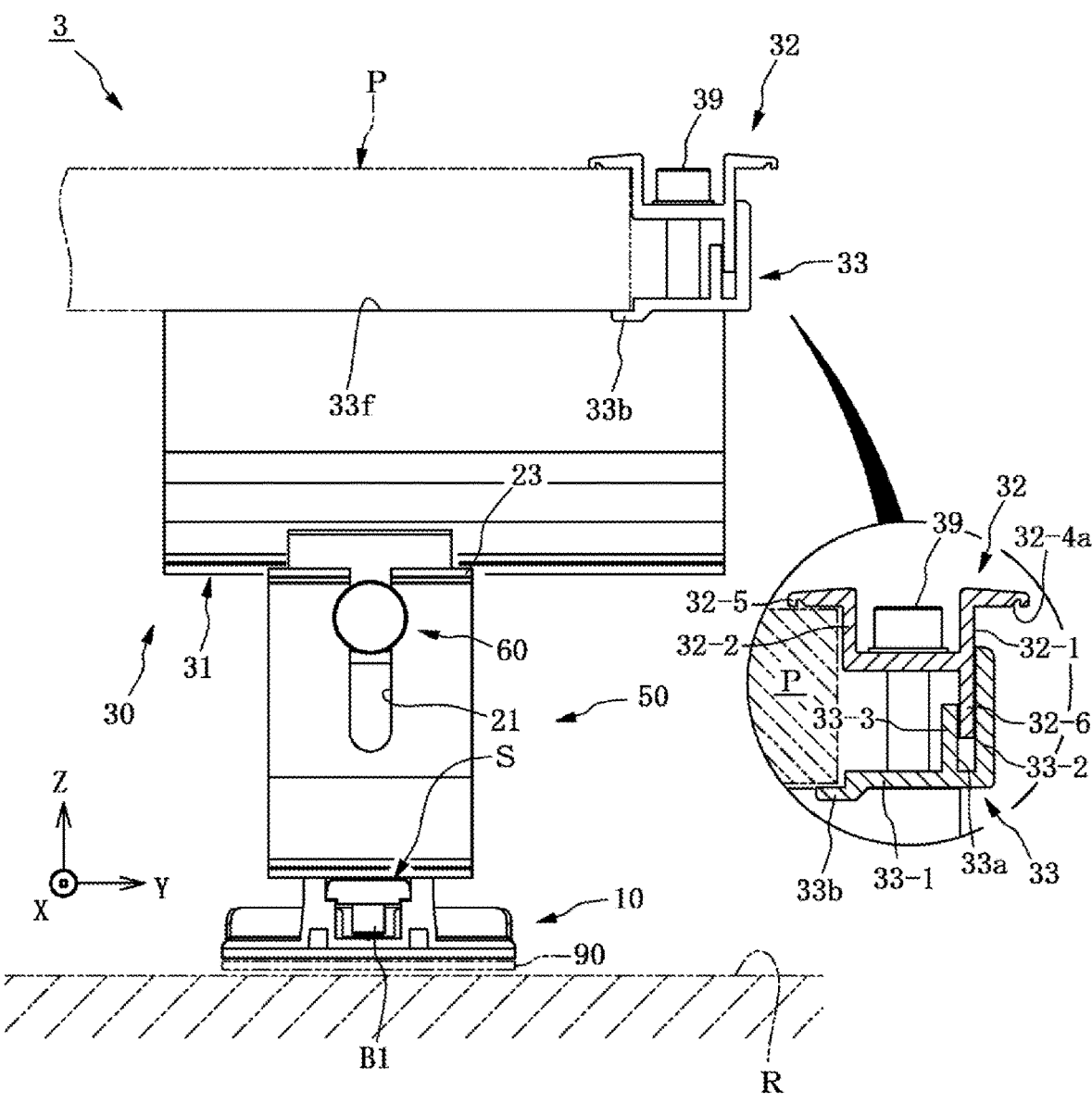
FIG. 19 is a (first) rear view of the trestle according to Embodiment 3.

As illustrated in FIG. 19, the fixing unit 30 is used to fix the solar panel P. As illustrated in FIG. 18, the fixing unit 30 includes the installation object arrangement member 31 (horizontal bar), the fixing member 32, a tilting suppressing member 33, and the second fastener 39.

The installation object arrangement member 31 (horizontal bar) is formed with the fixing member mounting groove 31a along the Y-axis direction. An opening 31e that opens upward (in the +Z direction) is formed in the bottom surface of the fixing member mounting groove 31a, unlike Embodiment 1. Furthermore, at the upper end on the +Z side of the installation object arrangement member 31, the solar panel P is disposed and an arrangement surface 3 1f parallel to the XY plane is provided.

A pair of third grooves 31a-R and 31a-L into which a part of the bolt head of the second fastener 39 is fitted are formed inside the fixing member mounting groove 31a.

Figure 20:
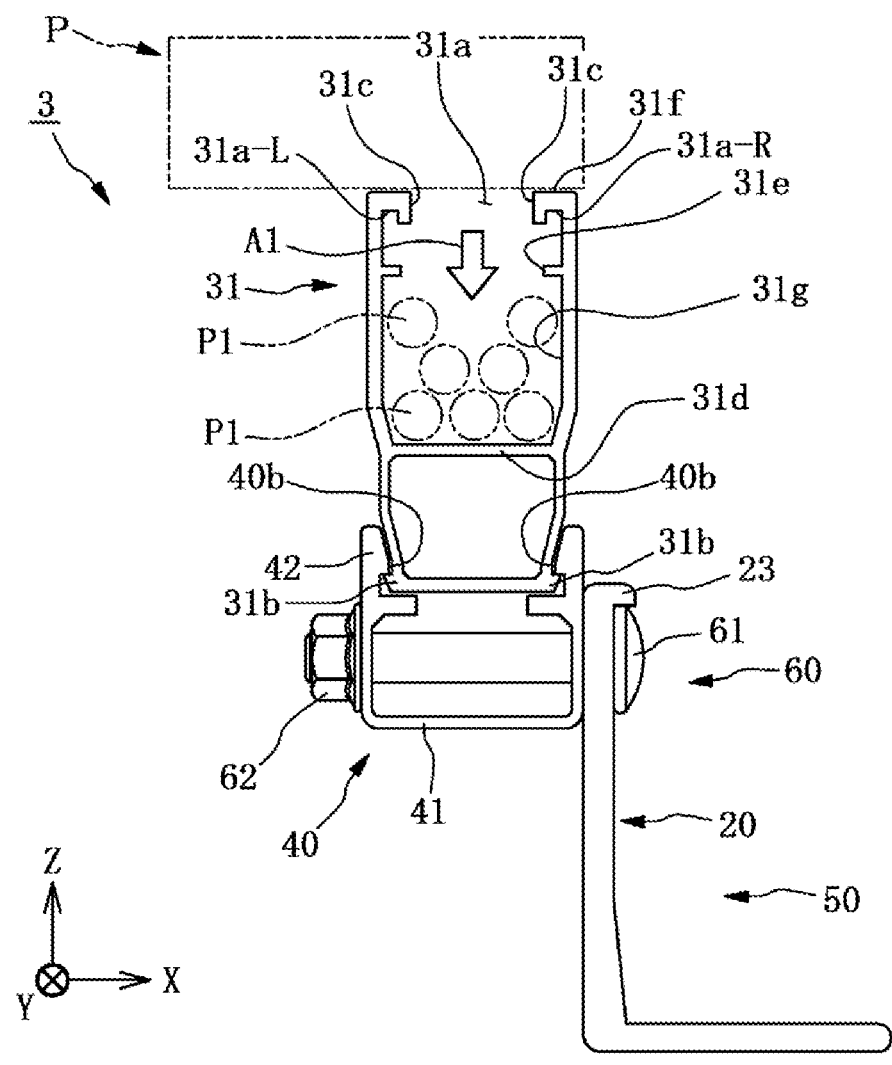
FIG. 20 is a side view of the trestle according to Embodiment 3.

As illustrated in FIG. 20, a cable P1 drawn out from the solar panel P is disposed in a space 31g on the upper side (+Z side) inside the installation object arrangement member 31 partitioned by the partition wall 31d. The cable P1 is inserted from the opening 31e and disposed in the space 31g as indicated by an arrow A1 in FIG. 20. Note that, in Embodiment 3, the cable P1 is disposed in the space 31g. However, the present disclosure is not limited thereto. A member other than the cable P1 may be disposed in the space 31g. For example, a cable connector connected to the cable P1 may be disposed in the space 31g.

Figure 21:
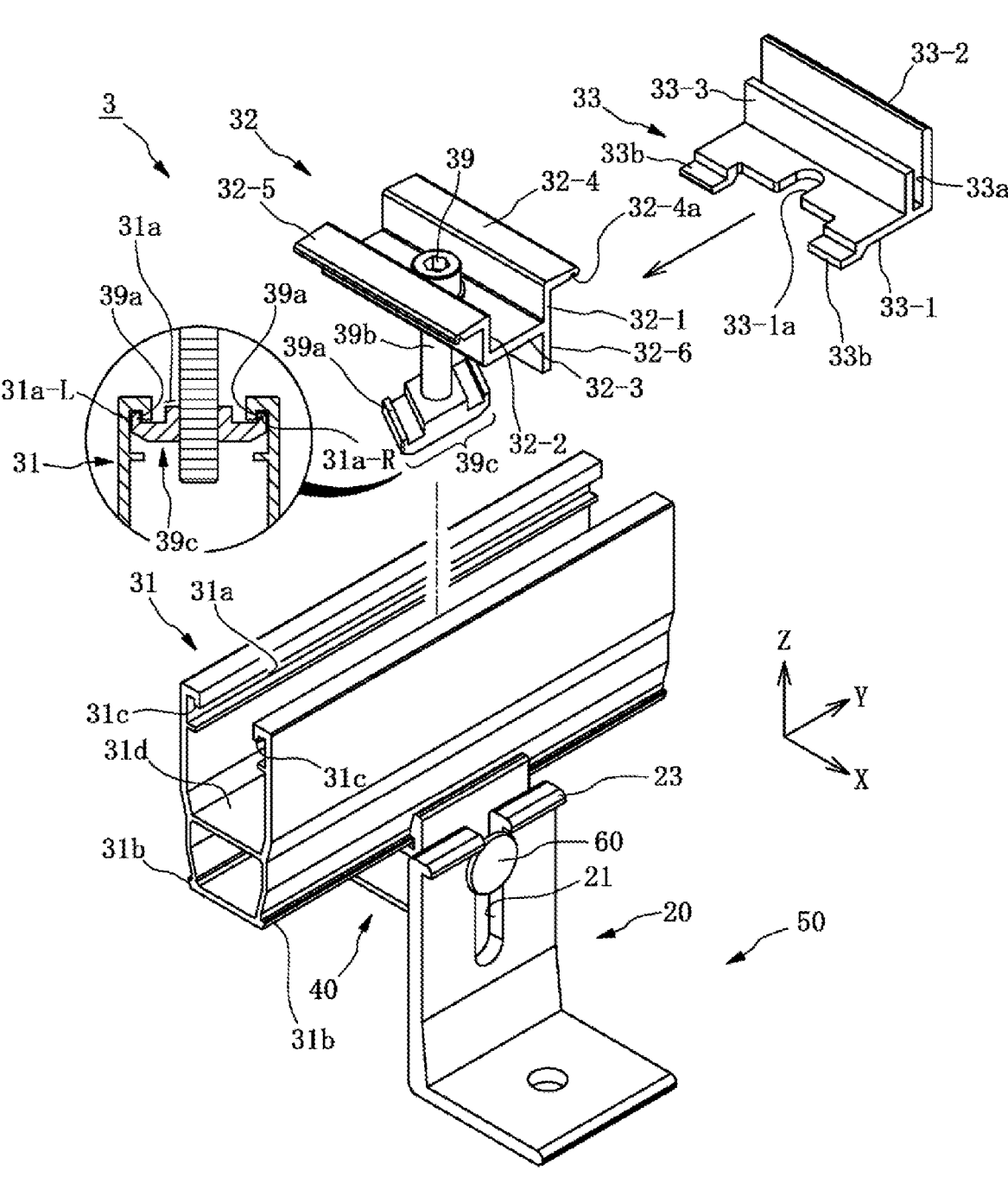
FIG. 21 is an exploded perspective view of the trestle according to Embodiment 3.
Figure 22:
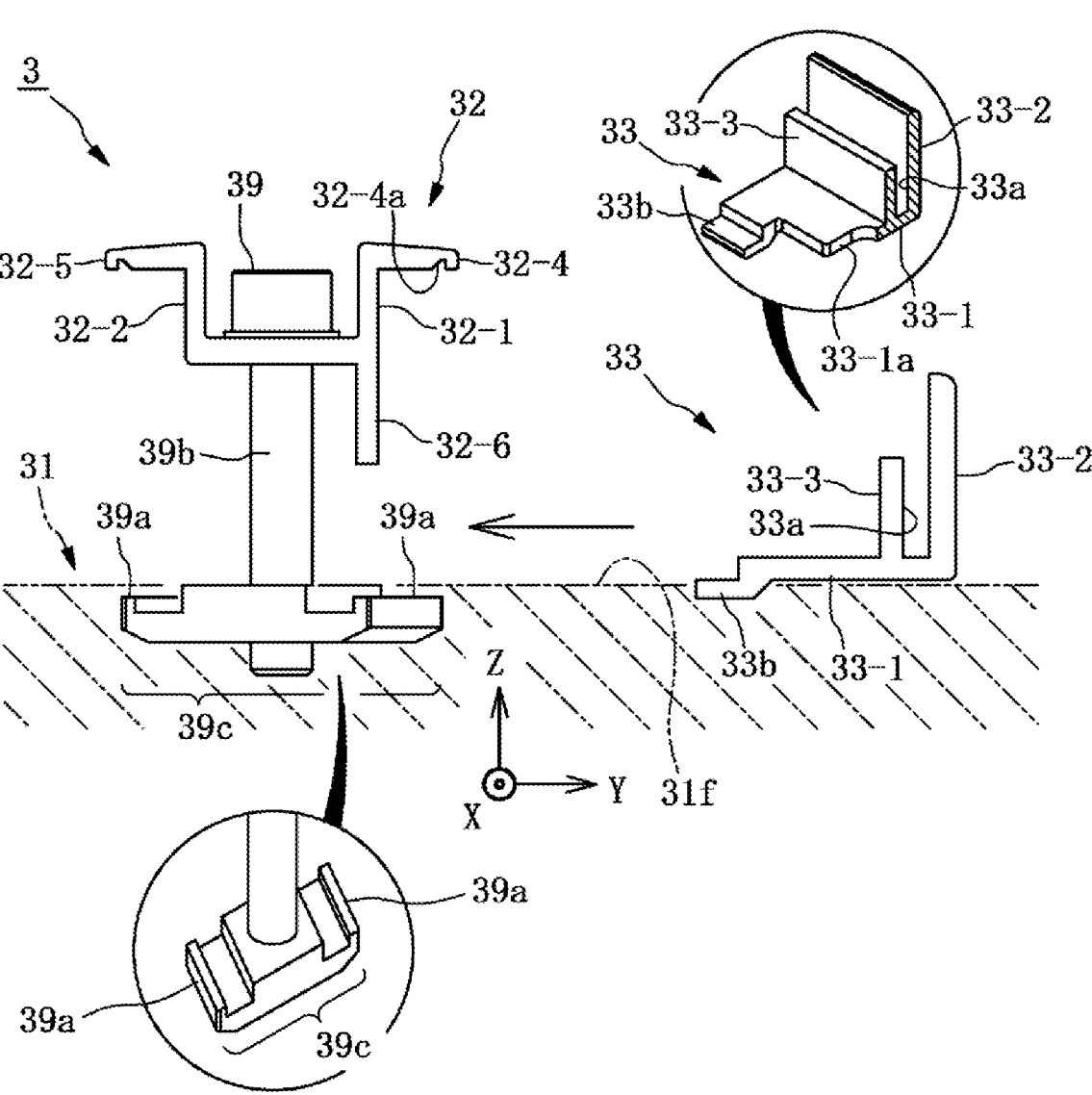
FIG. 22 is a side view of a fixing member and a tilting characteristic member of the trestle according to Embodiment 3.

As illustrated in FIGS. 21 and 22, the fixing member 32 includes a plate-shaped protrusion 32-6 that extends in the −Z direction from the extension 32-5, unlike the fixing member 32 of Embodiment 1.

The tilting suppressing member 33 supports the fixing member 32 with respect to the arrangement surface 31f of the installation object arrangement member 31, thereby suppressing the fixing member 32 from tilting with respect to the arrangement surface 31f. For example, the tilting suppressing member 33 suppresses tilting of the fixing member 32 when a worker temporarily fixes the fixing member 32 to the installation object arrangement member 31. The tilting suppressing member 33 includes a bottom wall 33-1 and side walls 33-2 and 33-3.

The bottom wall 33-1 includes a bottom surface that can be disposed on the arrangement surface 31f of the installation object arrangement member 31. The bottom wall 33-1 is formed with a notch 33-1a in which a bolt shaft portion of the second fastener 39 is disposed.

The side wall 33-2 and the side wall 33-3 are formed protruding upward (in the +Z direction) from the bottom wall 33-1 in parallel with each other. A gap 33a is formed between the side wall 33-2 and the side wall 33-3.

As illustrated in FIG. 19, the gap 33a is formed to have a shape and size that allow the protrusion 32-6 of the fixing member 32 to fit into the gap 33a.

As illustrated in FIG. 19, the tilting suppressing member 33 is further formed with a third engager 33b.

The third engager 33b engages the lower end of the solar panel P disposed on the arrangement surface 31f. As a result, the third engager 33b suppresses the fixing member 32 from tilting with respect to the arrangement surface 31f together with the tilting suppressing member 33. As illustrated in FIG. 21, the third engager 33b is formed protruding in the −Y direction from the bottom wall 33-1. The third engager 33b is formed to have an upper surface (+Z side surface) that is offset downward (in the −Z direction) from the upper surface (+Z side surface) of the bottom wall 33-1. As a result, as illustrated in FIG. 19, the upper surface of the third engager 33b is formed to be substantially the same XY plane as the arrangement surface 31f when the tilting suppressing member 33 is disposed on the arrangement surface 31f.

As illustrated in FIG. 22, the second fastener 39 includes a bolt 39b and a nut 39c including a rhombic nut. In Embodiment 3, the second engager 39a is formed not on the bolt 39b but on the nut 39c.

The second engager 39a is formed protruding upward (in the +Z direction). As illustrated in FIG. 21, the second engager 39a fits into the third grooves 31a-R and 31a-L formed inside the fixing member mounting groove 31a.

The receiving member 40, the base unit 50, and the first fastener 60 have functions equivalent to the functions of the receiving member 40, the base unit 50, and the first fastener 60 in Embodiment 1, as illustrated in FIG. 18.

As described above, in the trestle 3 according to Embodiment 3, the fixing unit 30 includes the tilting suppressing member 33. Therefore, the trestle 3 can enhance the work efficiency of installation on a building.

Figure 23:
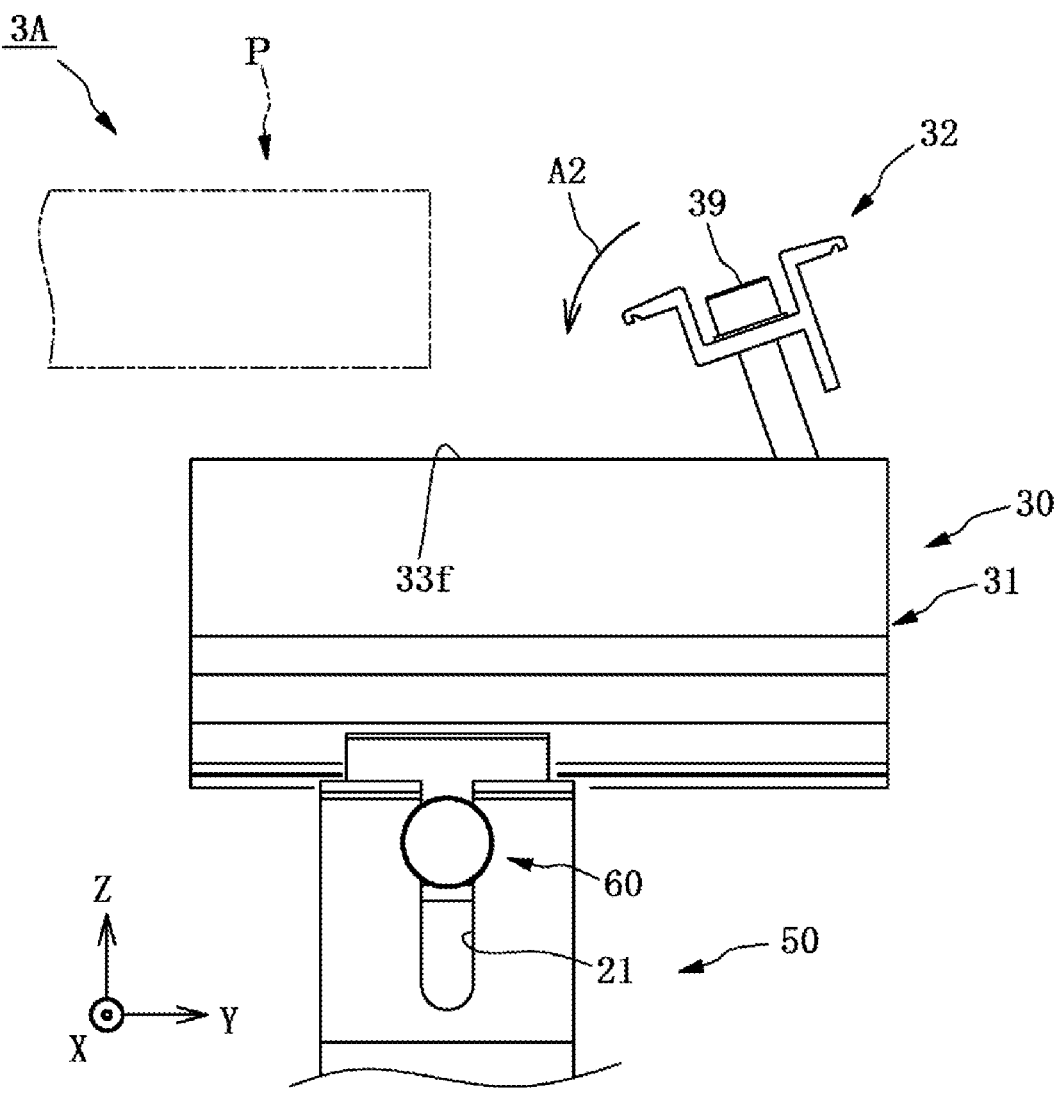
FIG. 23 is a side view of a trestle according to Comparative Example 2.

For example, in Comparative Example 2 illustrated in FIG. 23, the fixing unit 30 of a trestle 3A does not have the tilting suppressing member 33. In this case, when the solar panel P is installed, the fixing member 32 may tilt with respect to the installation object arrangement member 31 as indicated by an arrow A2.

On the other hand, as illustrated in FIG. 18, in the trestle 3 according to Embodiment 3, the fixing unit 30 includes the tilting suppressing member 33. Therefore, the trestle 3 can suppress the fixing member 32 from tilting with respect to the installation object arrangement member 31 when the solar panel P is installed. As a consequence, the trestle 3 can enhance the work efficiency of installation on a building.

Furthermore, in the trestle 3 according to Embodiment 3, as illustrated in FIGS. 19 and 21, the tilting suppressing member 33 is formed with the third engager 33b. Therefore, the trestle 3 can enhance the work efficiency of installation on a building.

Figure 24:
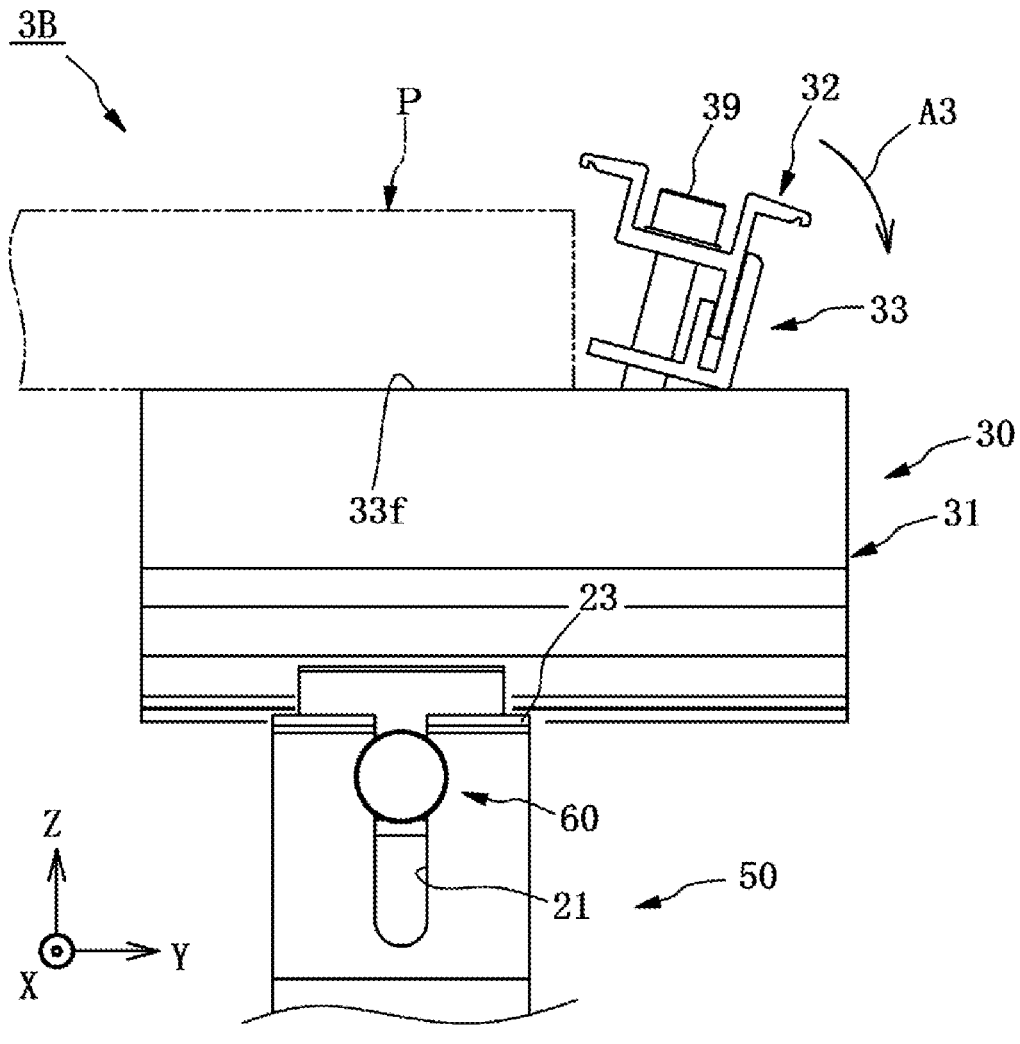
FIG. 24 is a side view of a trestle according to Comparative Example 3.

For example, in a trestle 3B according to Comparative Example 3 illustrated in FIG. 24, the tilting suppressing member 33 is not formed with the third engager 33b. In this case, since the tilting suppressing member 33 does not engage the lower end of the solar panel P, the fixing member 32 may tilt with respect to the installation object arrangement member 31 together with the tilting suppressing member 33 as indicated by an arrow A3.

On the other hand, as illustrated in FIGS. 19 and 21, the tilting suppressing member 33 is formed with the third engager 33b. Therefore, since the third engager 33b of the trestle 3 engages the lower end of the solar panel P, the fixing member 32 can be suppressed from tilting together with the tilting suppression member 33. As a consequence, the trestle 3 can enhance the work efficiency of installation on a building.

Furthermore, in the trestle 3 according to Embodiment 3, the tilting suppressing member 33 supports the fixing member 32 with respect to the arrangement surface 31f of the installation object arrangement member 31. By changing the height of the fixing member 32 with respect to the tilting suppressing member 33, the trestle 3 can fix the solar panels P having various thicknesses. As a result, Embodiment 3 can provide the trestle 3 that is easy to use.

Also in the trestle 3 according to Embodiment 3, effects equivalent to the effects of Embodiment 1 are obtained.

Figure 25:
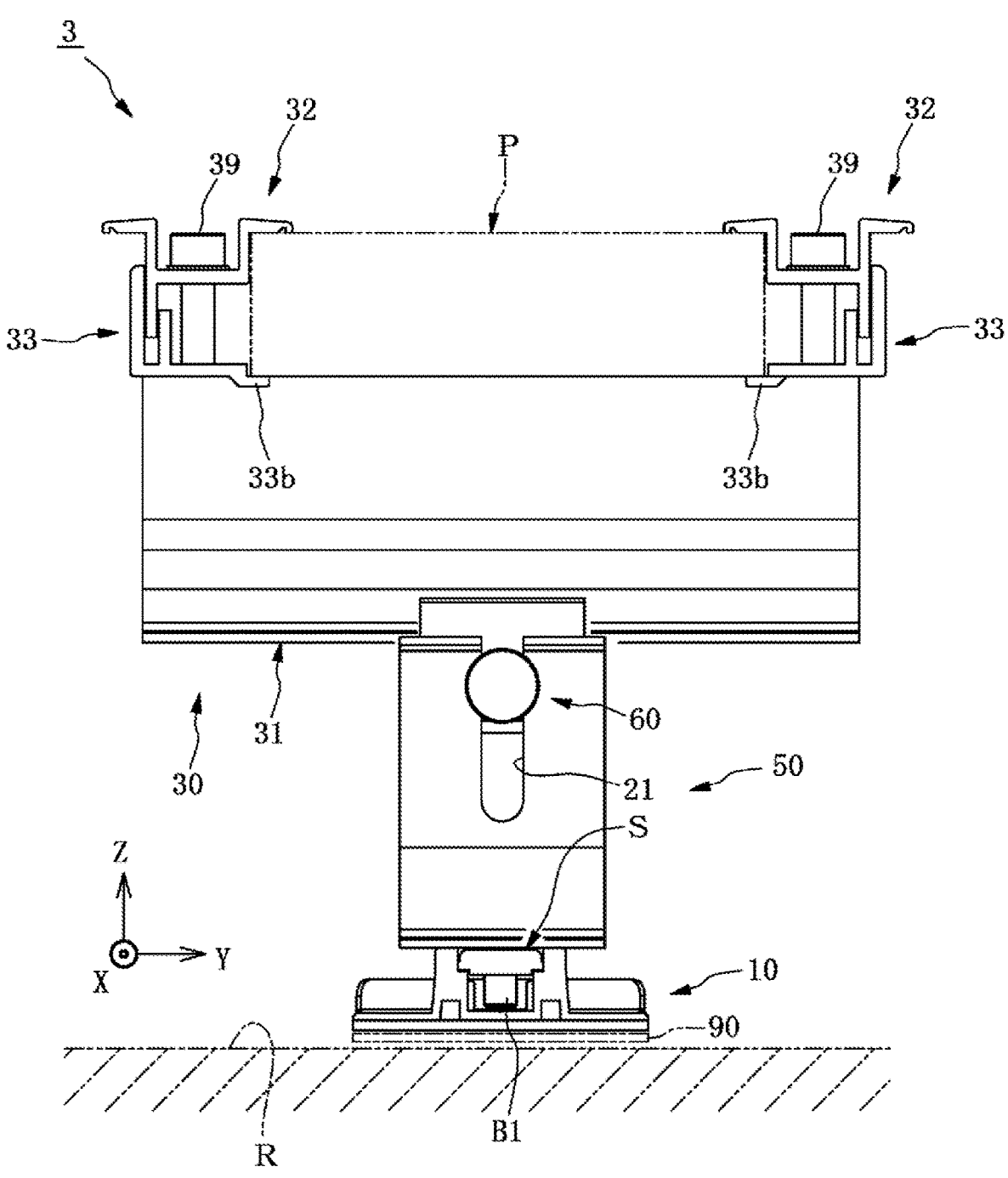
FIG. 25 is a (second) rear view of the trestle according to Embodiment 3.

Note that, as illustrated in FIGS. 18 and 19, Embodiment 3 illustrates an example in which the trestle 3 includes one fixing member 32 and one tilting suppressing member 33. However, this is an example for explaining the trestle 3. The trestle 3 may have a plurality of fixing members 32 and a plurality of tilting suppressing members 33. The number of the fixing members 32 to be installed and the number of the tilting suppressing members 33 to be installed are appropriately changed according to the number of the solar panels P and the like. For example, as illustrated in FIG. 25, from the viewpoint that the trestle 3 can stably fix the solar panel P, one solar panel P is preferably fixed to be sandwiched between two fixing members 32 and two tilting suppressing members 33.

Embodiment 4

Figure 26:
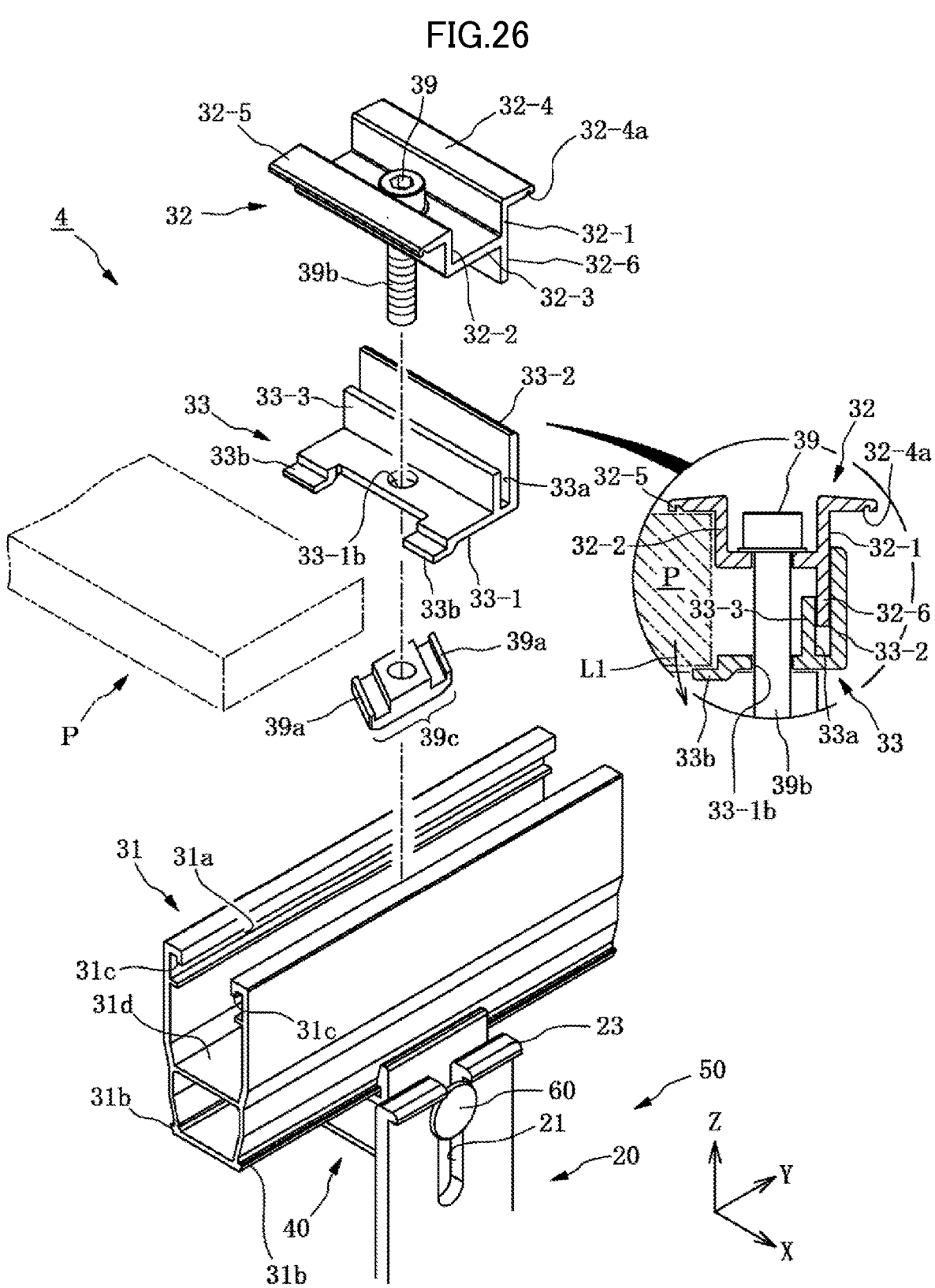
FIG. 26 is an exploded perspective view of a trestle according to Embodiment 4.

In Embodiment 3 above, as illustrated in FIG. 21, the bottom wall 33-1 of the tilting suppressing member 33 is formed with the notch 33-1a in which the bolt shaft portion of the second fastener 39 is disposed. However, the present disclosure is not limited thereto. As illustrated in FIG. 26, the bottom wall 33-1 of the tilting suppressing member 33 is formed with a hole 33-1b, into which the bolt shaft portion of the second fastener 39 is inserted, instead of the notch 33-1a.

In the trestle 4 according to Embodiment 4, when the tilting suppressing member 33 receives a load L1 applied from the solar panel P, an inner surface of the hole 33-1b contacts the bolt 39b of the second fastener 39 as compared with Embodiment 3. As a result, in the trestle 4, the fixing member 32 and the tilting suppressing member 33 are stably disposed with respect to the installation object arrangement member 31. As a consequence, the trestle 4 can stabilize the fixation of the solar panel P to the installation object arrangement member 31.

Also in the trestle 4 according to Embodiment 4, effects equivalent to the effects of Embodiment 1 to 3 are obtained.

Note that, in Embodiment 4, the hole 33-1b is a perfect circular hole. However, the present disclosure is not limited thereto. The hole 33-1b may have a shape other than a perfect circular hole.

Embodiments of the present disclosure are described above, but the present disclosure is not limited by the embodiments described above.

For example, in Embodiment 1, the fixing unit 30 of the trestle 1 includes three fixing members 32 as illustrated in FIG. 4. However, the number of fixing members 32 is arbitrary and is not limited to three. The fixing unit 30 may have two or less fixing members 32 or may have four or more fixing members 32. The number of fixing members 32 included in the fixing unit 30 is appropriately changed depending on the length in the Y-axis direction of the installation object arrangement member 31 included in the fixing unit 30 and the number and size of the solar panels P installed on the installation object arrangement member 31.

Figure 27:
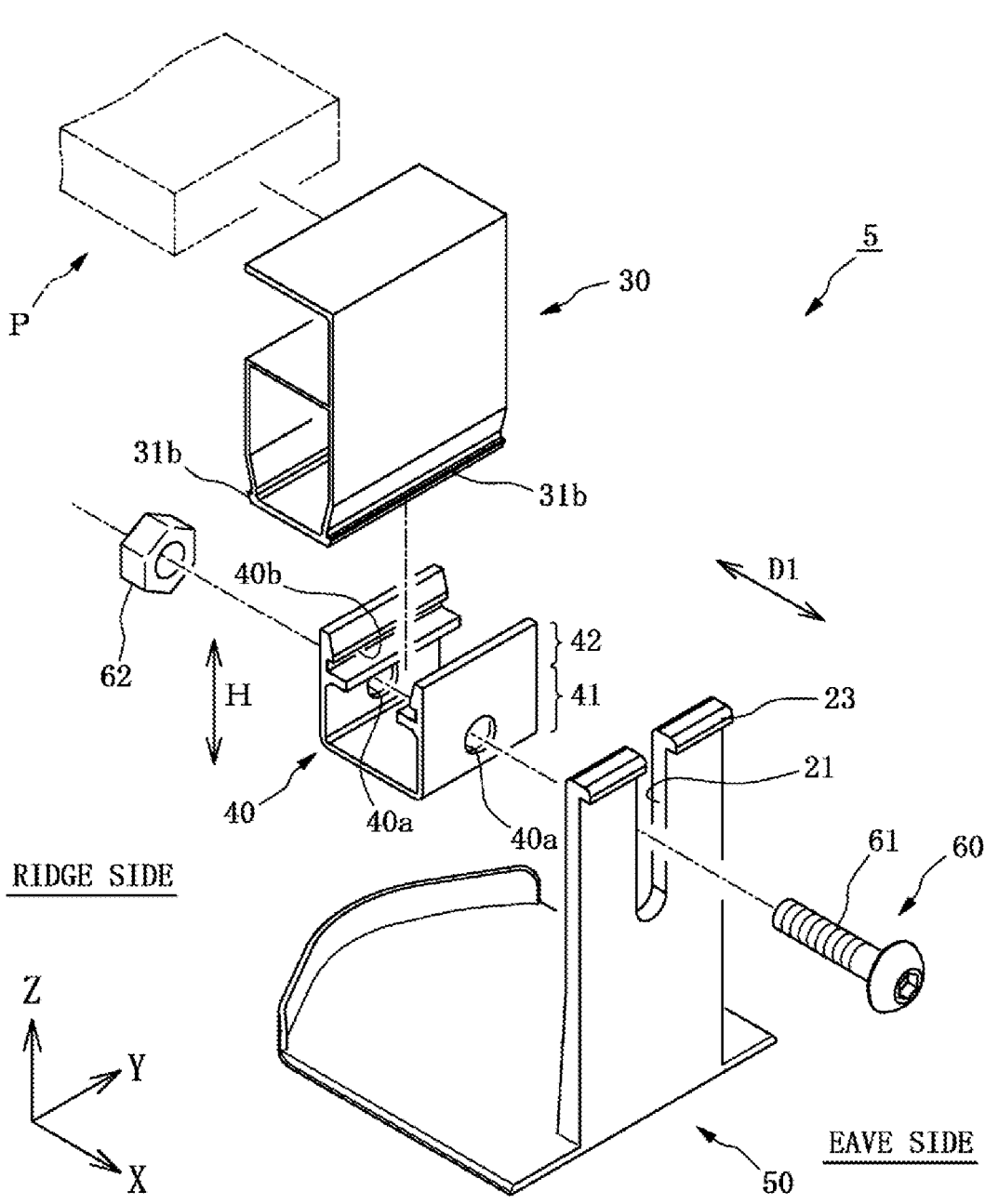
FIG. 27 is an exploded perspective view of a trestle according to Modified Example 1.

Furthermore, in Embodiment 1, the base unit 50 includes a plurality of components such as the base 10, the slide bracket S (slide member), the support member 20, and the support member mounting fastener B1. However, the present disclosure is not limited thereto. Like a trestle 5 according to Modified Example 1 illustrated in FIG. 27, for example, the base unit 50 may include a smaller number of components, or may include a single component.

Furthermore, in Embodiment 1, as illustrated in FIG. 4, the fixing unit 30 includes a plurality of components such as the installation object arrangement member 31, the fixing member 32, the cover 37, the fixing member receiving member 38, and the second fastener 39. However, the present disclosure is not limited thereto. For example, like the trestle 5 according to Modified Example 1 illustrated in FIG. 27, the fixing unit 30 may include a smaller number of components, or may include a single component.

Furthermore, in Embodiment 1, as illustrated in FIG. 8, the fixing unit 30 is formed with the first engager 31b, and the first engager 31b engages the receiving member 40, so that the first engaged portion 40b is formed to suppress the fixing unit 30 from detaching from the receiving member 40 upward (in the +Z direction). However, the present disclosure is not limited thereto. The fixing unit 30 may be formed with an engaged portion, and the receiving member 40 may be formed with an engager that is engaged with the engaged portion of the fixing unit 30.

Figure 28:
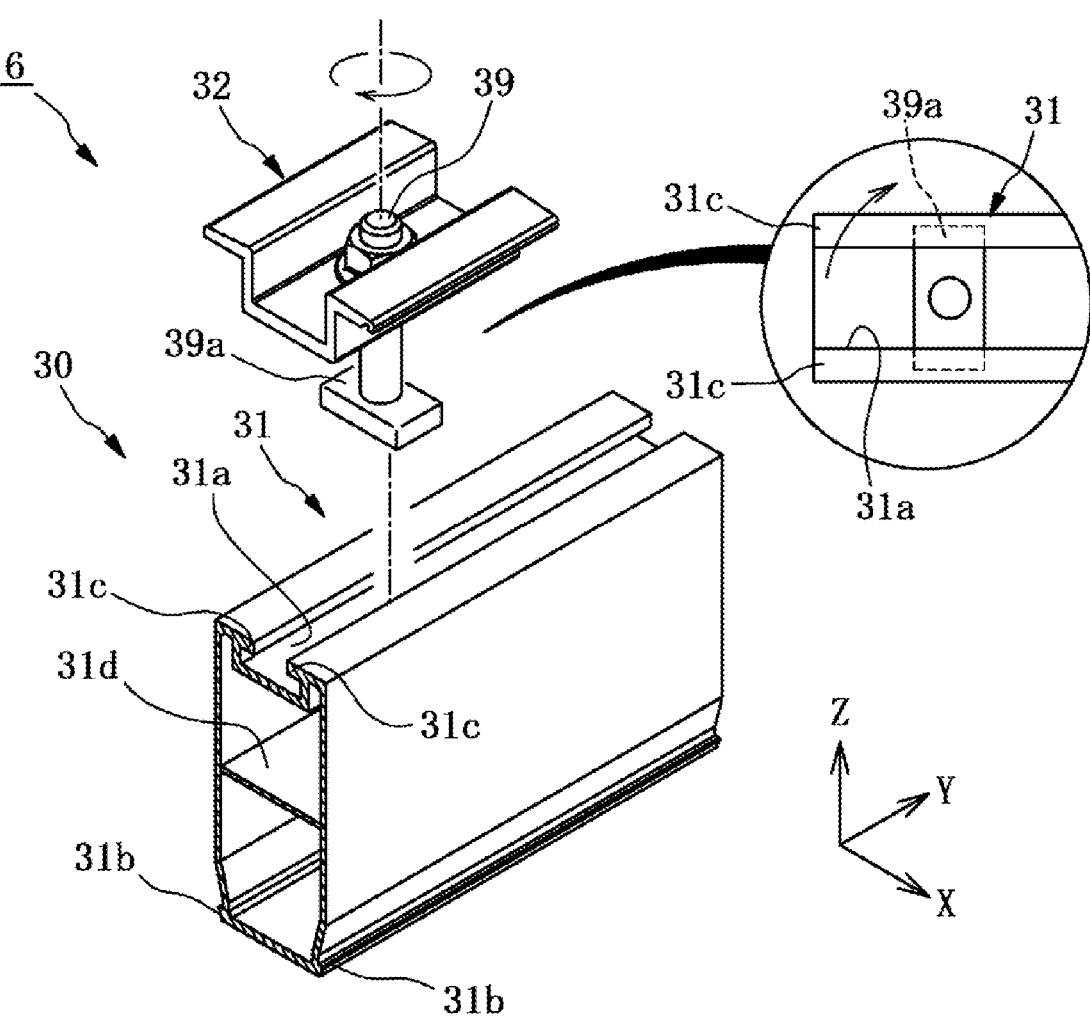
FIG. 28 is an exploded perspective view of a fixing unit of a trestle according to Modified Example 2.

Furthermore, in Embodiment 1, as illustrated in FIGS. 6 and 7, the second fastener 39 includes a rhombic bolt with a rhombic portion on the bolt head. The second engager 39a is formed in the rhombic portion of the bolt head. However, the present disclosure is not limited thereto. The second fastener 39 may have a member other than a rhomboid bolt as long as the second engager 39a can be formed. For example, like a trestle 6 according to Modified Example 2 illustrated in FIG. 28, the second fastener 39 may have a square bolt having a rectangular plate-shaped head. The second fastener 39 may be a member other than a rhombic bolt or a square bolt.

As illustrated in FIGS. 3 and 5, the cover 37 includes the cover main body 37-1 and the spacer 37-2. However, the present disclosure is not limited thereto. The cover 37 may not have the spacer 37-2 depending on the position in the height direction H of the cover main body 37-1 from the installation object arrangement member 31. Furthermore, in the cover 37, the spacer 37-2 may be replaced with spacers 37-2 having different thicknesses depending on the position in the height direction H of the cover main body 37-1 from the installation object arrangement member 31.

Furthermore, in Embodiment 1, as illustrated in FIG. 6, the second engager 39a is provided on the bolt 39b (rhombic bolt). However, the present disclosure is not limited thereto. The second fastener 39 according to Embodiment 1 may have a rhombic nut, and the second engager 39a may be provided on the rhombic nut.

Furthermore, in Embodiment 3, as illustrated in FIG. 22, the second engager 39a is provided on the nut 39c (rhombic nut). However, the present disclosure is not limited thereto. The second fastener 39 according to Embodiment 3 may have a rhombic bolt, and the second engager 39a may be provided on the rhombic bolt.

Furthermore, in Embodiments 1 to 3, the trestles 1 to 3 are described to fix a solar panel. However, the present disclosure is not limited thereto. The trestles 1 to 3 may support an object to be installed on the roof of a house other than a solar panel. For example, the trestles 1 to 3 may support a water heater panel. The trestles 1 to 3 can support any object that is a framed panel. Moreover, the trestles 1 to 3 may support objects other than framed panels.

Furthermore, in Embodiment 1, referencing FIGS. 1 and 4, it is clear that the trestle 1 is mounted on the roof surface R such that the first direction D1 matches the eave-ridge direction of the house, the first direction D1 being the forming direction of the first groove 10*a* of the base 10. However, the present disclosure is not limited thereto. The trestle 1 may by mounted on the roof surface R such that the first direction D1 does not match the eave-ridge direction of the house, the first direction D1 being the forming direction of the first groove 10*a* of the base 10. Any direction can be used for the mounting direction of the trestle 1, and the mounting direction is appropriately changed.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

1, 1A, 2, 3, 3A, 3B, 4, 5, 6 Trestle
10 Base
10*a* First groove (support member fixing groove)
11 Groove forming portion
11R, 11L Side wall
12R, 12L Second groove
13R, 13L Slide restrictor
14R, 14L Flange portion
14*a*-1 to 14*a*-6 Fastener insertion hole
15 Base main body
16 Wall
16-1 First inclined surface
16-2 Second inclined surface
16-3 Protruding surface
17 Flowpath
17*a* Discharge port
18 Rear surface.
20 Support member
21 Height direction adjusting groove (receiving member mounting portion)
22 Hole (receiving member mounting portion)
23 Protrusion
30 Fixing unit
31 Installation object arrangement member (horizontal bar)
31*a* Fixing member mounting groove
31*a*-R, 31*a*-L Third groove
31*b* First engager
31*c* Second engaged portion
31*d* Partition wall
31*e* Opening
31*f* Arrangement surface
31*g* Space
32 Fixing member
32-1, 32-2 Side wall
32-3 Coupling plate

32-4, 32-5 Extension
32-4*a* Engaged portion
32-6 Protrusion
33 Tilting suppressing member
33-1 Bottom wall
33-1*a* Notch
33-1*b* Hole
33-2, 33-3 Side wall
33*a* Gap.
33*b* Third engager
37 Cover
37-1 Cover main body
37-1*a* Tubular portion
37-1*b* Engager
37-2 Spacer
37-2*a* Hole
38 Fixing member receiving member
38*a* Engager
38*b* Hook portion
39 Second fastener
39*a* Second engager
39*b*. Bolt (rhombic bolt).
39*c* Nut
39*d* Bolt head
40 Receiving member
40*a* Hole (inserted portion)
40*b* First engaged portion
40*c* Notch (inserted portion)
41 Receiving member main body
41-1, 41-2 Side wall
41-3 Bottom plate
42 Sandwiching portion
42-1, 42-2 Extension
50 Base unit
60 First fastener
60A, 60B Fastener
61 Bolt
62 Nut
90 Sheet
S Slide bracket (slide member)
Sa Screw hole
Sb Fitter.
B1 Support member mounting fastener
B2 Base mounting fastener
D1 First direction
H Height direction
P Solar panel (installation object)
P1 Cable
R Roof surface
W Rainwater
A1, A2, A3 Arrow
L1 Load

INDUSTRIAL APPLICABILITY

The present disclosure is suitable for use as a trestle that is mounted on a roof surface of a house, and that supports a solar panel installed on a surface of the roof surface.

What is claimed is:

1. A trestle comprising:
a fixing unit for fixing an installation object installed on a roof surface of a building;
a receiving member receiving the fixing unit from below;
a base unit formed with a receiving member mounting portion for fixing the receiving member to be adjustable in a height direction from the roof surface, and fixed to the roof surface; and a first fastener fixing the receiving member to base unit by being attached to the receiving member mounting portion, wherein the receiving member includes a sandwiching portion that sandwiches a part of the fixing unit and is formed with an inserted portion into which the first fastener is inserted, the first fastener is formed in a shape attachable to the receiving member mounting portion and a shape insertable into the inserted portion, and sandwiches a part of the fixing unit in the sandwiching portion, and the base unit comprises a base formed with a support member fixing groove, a slide member slidably fitted into the support member fixing groove, and a support member fixed to the slide member and provided with the receiving member mounting portion.

2. The trestle according to claim 1, wherein the receiving member mounting portion is a height direction adjusting groove into which the first fastener is inserted, the height direction adjusting groove extending in the height direction.

3. The trestle according to claim 1, wherein the inserted portion is a hole or a notch, and is formed at a position below a position where the receiving member sandwiches a part of the fixing unit.

4. The trestle according to claim 1, wherein a first engager is formed on one of the fixing unit and the receiving member, and engages the other of the fixing unit and the receiving member, thereby forming a first engaged portion that suppresses the fixing unit from detaching from the receiving member upward in the height direction.

5. The trestle according to claim 1, wherein the fixing unit comprises:

an installation object arrangement member on which the installation object is disposed;

a fixing member pressing and fixing the installation object disposed on the installation object arrangement member; and a second fastener sandwiching the installation object between the installation object arrangement member and the fixing member, and fastening the installation object arrangement member and the fixing member.

6. The trestle according to claim 5, wherein the building includes an eave and a ridge of a roof, a fixing member mounting groove is formed in the installation object arrangement member in a direction intersecting an eave-ridge direction or along the same direction as the eave-ridge direction, the eave-ridge direction being a direction from the ridge to the eave of the building, a second engaged portion is formed in the fixing member mounting groove, and the second fastener is formed with a second engager that engages with the second engaged portion.

7. The trestle according to claim 6, wherein the second fastener includes a rhombic bolt or a rhombic nut for attaching the fixing member to the fixing member mounting groove, and the second engager is provided on a rhombic portion of the rhombic bolt or the rhombic nut.

8. The trestle according to claim 5, wherein the installation object arrangement member is formed in a shape extending from one end to the other end, the fixing unit includes a cover that covers at least a part of the one end of the installation object arrangement member, and the cover is disposed on the installation object arrangement member, and is pressed by the fixing member to be fixed to the installation object arrangement member.

9. The trestle according to claim 5, wherein the fixing unit includes a fixing member receiving member that is disposed on the installation object arrangement member, and is pressed by the fixing member to be fixed to the installation object arrangement member, and the fixing member receiving member is disposed on the installation object arrangement member together with the installation object, or is disposed on the installation object arrangement member instead of the installation object.

10. The trestle according to claim 5, wherein the installation object arrangement member is provided with an arrangement surface on which the installation object is disposed, and the fixing unit includes a tilting suppressing member that suppresses the fixing member from tilting with respect to the arrangement surface by supporting the fixing member with respect to the arrangement surface, the tilting suppressing member having a surface to be disposed on the arrangement surface.

11. The trestle according to claim 10, wherein the tilting suppressing member is formed with a third engager that engages the installation object disposed on the arrangement surface, thereby suppressing the fixing member from tilting with respect to the arrangement surface together with the tilting suppressing member.

* * * * *